United States Patent
Terashima et al.

(10) Patent No.: US 12,549,084 B2
(45) Date of Patent: Feb. 10, 2026

(54) CONTROL DEVICE AND POWER CONVERSION DEVICE FOR DETECTING FAILURE OF AN AC CAPACITOR

(71) Applicant: TMEIC Corporation, Tokyo (JP)

(72) Inventors: Daiki Terashima, Tokyo (JP); Issei Fukasawa, Tokyo (JP)

(73) Assignee: TMEIC Corporation, Tokyo (JP)

( * ) Notice: Subject to any disclaimer, the term of this patent is extended or adjusted under 35 U.S.C. 154(b) by 118 days.

(21) Appl. No.: 18/580,778

(22) PCT Filed: Jun. 30, 2022

(86) PCT No.: PCT/JP2022/026318
§ 371 (c)(1),
(2) Date: Jan. 19, 2024

(87) PCT Pub. No.: WO2024/004154
PCT Pub. Date: Jan. 4, 2024

(65) Prior Publication Data
US 2024/0380303 A1    Nov. 14, 2024

(51) Int. Cl.
*H02M 1/00* (2006.01)
*G01R 31/28* (2006.01)
(Continued)

(52) U.S. Cl.
CPC ...... *H02M 1/0009* (2021.05); *G01R 31/2843* (2013.01); *H02M 1/36* (2013.01); *H02M 7/003* (2013.01)

(58) Field of Classification Search
CPC ........ H02M 1/0009; H02M 1/36; H02M 1/32; H02M 7/5387; H02M 7/003; H02M 7/48; G01R 31/2843; G01R 31/42
See application file for complete search history.

(56) References Cited

U.S. PATENT DOCUMENTS

| | | | |
|---|---|---|---|
| 9,054,589 B2* | 6/2015 | Cheng | H02M 5/451 |
| 9,294,005 B2* | 3/2016 | Tallam | H02M 5/452 |

(Continued)

FOREIGN PATENT DOCUMENTS

| | | | | |
|---|---|---|---|---|
| CN | 111262462 A | * | 6/2020 | H02J 3/01 |
| EP | 2596564 B1 | * | 3/2014 | H02J 3/1828 |
| JP | 2017-212838 A | | 11/2017 | |

OTHER PUBLICATIONS

International Search Report and Written Opinion issued Sep. 13, 2022 in PCT/JP2022/026318 filed on Jun. 30, 2022, 10 pages (with English Translation).

*Primary Examiner* — Jue Zhang
*Assistant Examiner* — Jye-June Lee
(74) *Attorney, Agent, or Firm* — Oblon, McClelland, Maier & Neustadt, L.L.P.

(57) ABSTRACT

A control device of a power conversion device includes: an amplitude calculating circuit which calculates each of values of amplitudes of fundamental wave components of the alternating currents of the respective phases based on the current values of the alternating currents of the respective phases and a fault determining circuit which performs a magnitude comparison between each of the values of the amplitudes of the fundamental wave components of the alternating currents of the respective phases calculated by the amplitude calculating circuit and a predetermined determination value and which determines a fault of the alternating-current capacitor when the value of the amplitude of at least any phase among the values of the amplitudes of the fundamental wave components of the alternating currents of the respective phases is smaller than the predetermined determination value.

9 Claims, 13 Drawing Sheets

(51) Int. Cl.
*H02M 1/36* (2007.01)
*H02M 7/00* (2006.01)

(56) References Cited

U.S. PATENT DOCUMENTS

| | | | | |
|---|---|---|---|---|
| 9,488,686 B2* | 11/2016 | Bhandarkar | ........ | H02M 5/4585 |
| 2023/0275528 A1* | 8/2023 | Terashima | ........ | H02M 7/53871 |
| | | | | 363/97 |
| 2023/0402939 A1* | 12/2023 | Terashima | .............. | H02M 1/32 |

* cited by examiner

| | CIRCUIT STATE | VOLTAGE WAVEFORM |
|---|---|---|
| FIG. 12A | DIRECT-CURRENT POWER SUPPLY (PV, ENERGY STORAGE SYSTEM) 2 — INVERTER CIRCUIT 13 — INVERTER OUTPUT VOLTAGE — SWITCH 14 — SERIES VOLTAGE 3, 1A, 16, 16a, CURRENT PATHWAY 11 | INVERTER VOLTAGE BEING CONTROLLED |
| FIG. 12B | DIRECT-CURRENT POWER SUPPLY (PV, ENERGY STORAGE SYSTEM) 2 — INVERTER CIRCUIT 13 — INVERTER OUTPUT VOLTAGE — SWITCH 14 — SERIES VOLTAGE 3, 1A, 16, 16a, CURRENT PATHWAY 11 | SYNCHRONIZATION DETERMINATION POSITIVE |
| FIG. 12C | DIRECT-CURRENT POWER SUPPLY (PV, ENERGY STORAGE SYSTEM) 2 — INVERTER CIRCUIT 13 — INVERTER OUTPUT VOLTAGE — THROW SWITCH 14 — SERIES VOLTAGE 3, 1A, 16, 16a, CURRENT PATHWAY 11 | INTERCONNECTION OPERATION BEING PERFORMED |

CONTROL DEVICE AND POWER CONVERSION DEVICE FOR DETECTING FAILURE OF AN AC CAPACITOR

FIELD

The present invention relates to a control device and a power conversion device.

BACKGROUND

Conventionally, a power conversion device is known in which a voltage matching operation is performed before a system interconnection operation is started (before an alternating-current switch is closed) and a system interconnection operation is subsequently started (an alternating-current switch is closed) (for example, refer to PTL 1).

A voltage matching operation is control for synchronizing output voltage of a power conversion device and system voltage before a system interconnection operation is started and, for example, the voltage matching operation is performed by matching an amplitude and a phase of alternating-current output voltage of the power conversion device with an amplitude and a phase of the system voltage. For example, the voltage matching operation is performed by an alternating-current-automatic voltage regulator (AC-AVR). Hereinafter, in the present specification, a voltage matching operation will also be referred to as "synchronous control".

CITATION LIST

Patent Literature

[PTL 1] JP 2017-212838 A

SUMMARY

Technical Problem

Among capacitors used as a filter for alternating-current output of a power conversion device, there are those having a fuse mechanism which disconnects a capacitor element from a circuit in the event of abnormal overheating. When the fuse mechanism is actuated, the alternating-current capacitor enters a state of an open fault. In such a case, usually, a fault is detected in the power conversion device as a synchronization abnormality during a voltage matching operation.

However, with a conventional power conversion device, there are cases where, despite an open fault occurring in an alternating-current capacitor, a fault is not detected at the time of a voltage matching operation. In this case, in the power conversion device, an alternating-current switch is closed and a system interconnection operation is started after the voltage matching operation and the operation may be continued thereafter without the fault being detected. When the power conversion device is operated in a state where the alternating-current capacitor has an open fault, there is a possibility that the power conversion device may cause an outflow of large higher harmonics to a system side and, at the same time, due to voltage application concentrating on normal alternating-current capacitors, there is also a possibility that the fault may spread to such normal alternating-current capacitors.

In consideration thereof, an object of the present disclosure is to detect a fault based on a current component of each phase which flows through an alternating-current capacitor in order to report fault information or stop a power conversion device and to suppress an outflow of higher harmonics to a system side and spreading of the fault to normal alternating-current capacitors.

Solution to Problem

A control device according to one aspect is a control device of a power conversion device including: at least one alternating-current capacitor which is positioned in a capacitor circuit branching from an alternating-current circuit on an output side of an inverter and which is disconnected from the circuit in the event of a fault; and a current sensor which is positioned in the capacitor circuit and which obtains each of current values of alternating currents of respective phases that flow through the alternating-current capacitor, the control device including: an amplitude calculating unit which obtains each of the current values of the alternating currents of the respective phases that flow through the alternating-current capacitor from the current sensor and which calculates each of values of amplitudes of fundamental wave components of the alternating currents of the respective phases based on the obtained current values of the alternating currents of the respective phases; and a fault determining unit which performs a magnitude comparison between each of the values of the amplitudes of the fundamental wave components of the alternating currents of the respective phases calculated by the amplitude calculating unit and a predetermined determination value and which determines a fault of the alternating-current capacitor when the value of the amplitude of at least any phase among the values of the amplitudes of the fundamental wave components of the alternating currents of the respective phases is smaller than the predetermined determination value.

In the control device according to the one aspect, the amplitude calculating unit may calculate each of the values of the amplitudes of the fundamental wave components of the alternating currents of the respective phases based on a predetermined current component of the alternating current of each phase calculated by multiplying each of the current values of the alternating currents of the respective phases by a value based on a phase angle adjusted based on a system voltage on a system side.

In addition, in the control device according to the one aspect, the amplitude calculating unit may calculate each of the values of the amplitudes of the fundamental wave components of the alternating currents of the respective phases based on a direct-current component extracted using a predetermined low-pass filter from a predetermined current component of the alternating current of each phase.

Furthermore, the control device according to the one aspect may further include an operation control unit which, when a fault of the alternating-current capacitor is determined by the fault determining unit during an interconnection operation by the inverter with the system side in a state where an alternating-current switch on the system side has been closed, outputs an operation instruction to stop the power conversion device and, at the same time, open the alternating-current switch.

Moreover, the control device according to the one aspect may further include an operation control unit which, when a fault of the alternating-current capacitor is determined by the fault determining unit during synchronous control for synchronizing an output voltage of the inverter and a system voltage of the system side which is performed during start-up of the power conversion device in a state where an alternating-current switch on the system side has been opened, outputs an operation instruction to stop the power conversion device.

A power conversion device according to the one aspect includes: an inverter which converts power and outputs alternating-current power; at least one alternating-current capacitor which is positioned in a capacitor circuit branching from an alternating-current circuit on an output side of the inverter and which is disconnected from the circuit in the event of a fault; a current sensor which is positioned in the capacitor circuit and which obtains each of current values of alternating currents of respective phases that flow through the alternating-current capacitor; an alternating-current switch which is positioned closer to a system side than a branch point to the capacitor circuit in the alternating-current circuit and which is capable of interrupting the alternating current flowing towards the system side; and any one of the control devices described above.

A control device according to another aspect is a control device of a power conversion device including: at least one alternating-current capacitor which is positioned in a capacitor circuit branching from an alternating-current circuit on an output side of an inverter and which is disconnected from the circuit in the event of a fault; and a current sensor which is positioned in series with an alternating-current reactor between the inverter and a branch point to the capacitor circuit in the alternating-current circuit on the output side of the inverter and which obtains each of current values of alternating currents of respective phases that flow through the alternating-current circuit, the control device including: an amplitude calculating unit which, during synchronous control for synchronizing an output voltage of the inverter and a system voltage of the system side which is performed during start-up of the power conversion device in a state where an alternating-current switch on the system side has been opened, obtains each of the current values of the alternating currents of the respective phases that flow through the alternating-current capacitor from the current sensor and which calculates each of values of amplitudes of fundamental wave components of the alternating currents of the respective phases based on the obtained current values of the alternating currents of the respective phases; a fault determining unit which performs a magnitude comparison between each of the values of the amplitudes of the fundamental wave components of the alternating currents of the respective phases calculated by the amplitude calculating unit and a predetermined determination value and which determines a fault of the alternating-current capacitor when the value of the amplitude of at least any phase among the values of the amplitudes of the fundamental wave components of the alternating currents of the respective phases is smaller than the predetermined determination value; and a fault information reporting unit which, when a fault of the alternating-current capacitor is determined by the fault determining unit during the synchronous control, reports fault information of the alternating-current capacitor.

In the control device according to the other aspect, the amplitude calculating unit may calculate each of the values of the amplitudes of the fundamental wave components of the alternating currents of the respective phases based on a predetermined current component of the alternating current of each phase calculated by multiplying each of the current values of the alternating currents of the respective phases by a value based on a phase angle adjusted based on a system voltage on the system side.

In addition, in the control device according to the other aspect, the amplitude calculating unit may calculate each of the values of the amplitudes of the fundamental wave components of the alternating currents of the respective phases based on a direct-current component extracted using a predetermined low-pass filter from a predetermined current component of the alternating current of each phase.

Furthermore, the control device according to the other aspect may further include an operation control unit which, when a fault of the alternating-current capacitor is reported by the fault information reporting unit during the synchronous control, outputs an operation instruction to stop the power conversion device.

A power conversion device according to the other aspect includes: an inverter which converts power and outputs alternating-current power; at least one alternating-current capacitor which is positioned in a capacitor circuit branching from an alternating-current circuit on an output side of the inverter and which is disconnected from the circuit in the event of a fault; a current sensor which is positioned in series with an alternating-current reactor between the inverter and a branch point to the capacitor circuit in the alternating-current circuit on the output side of the inverter and which obtains each of current values of alternating currents of respective phases that flow through the alternating-current circuit; an alternating-current switch which is positioned closer to the system side than the branch point in the alternating-current circuit and which is capable of interrupting the alternating current flowing towards the system side; and any one of the control devices described above.

Advantageous Effects of Invention

According to the present disclosure, by detecting a fault based on a current component of each phase which flows through an alternating-current capacitor, fault information can be reported or a power conversion device can be stopped and an outflow of higher harmonics to a system side and spreading of the fault to normal alternating-current capacitors can be suppressed.

BRIEF DESCRIPTION OF DRAWINGS

FIG. 12 is a diagram showing an example of an operation during a voltage matching operation (synchronous control) of the power conversion device shown in FIGS. 9 to 11.

DESCRIPTION OF EMBODIMENTS

Embodiments of a control device and a power conversion device according to the present disclosure will now be described with reference to the drawings.

Configuration of First Embodiment

Figure 1:
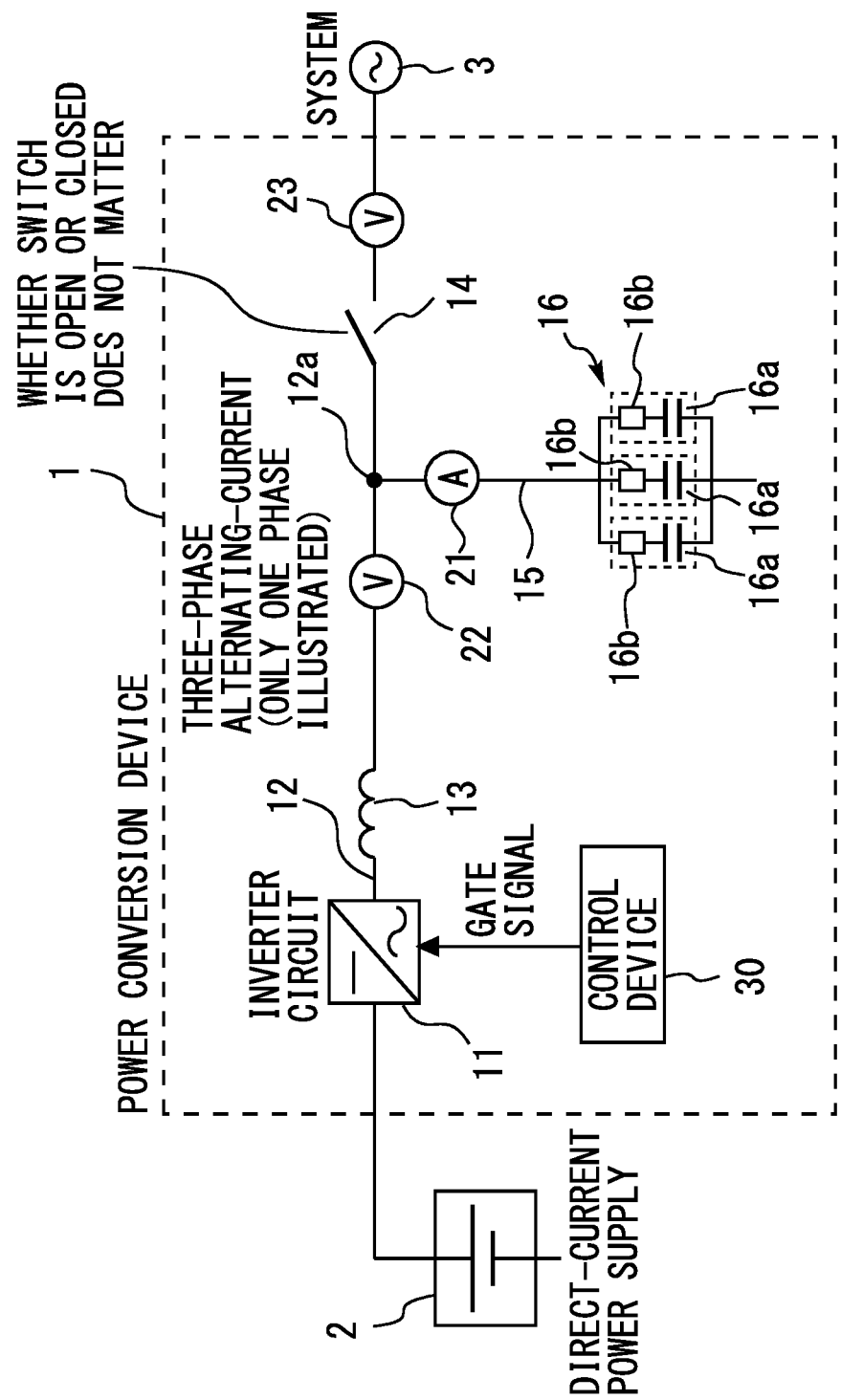
FIG. 1 is a diagram showing an example of a configuration of a control device and a power conversion device according to a first embodiment.

FIG. 1 is a diagram showing an example of a configuration of a control device 30 and a power conversion device 1 according to a first embodiment. As shown in FIG. 1, the power conversion device 1 is connected to a direct-current power supply 2 on a side of one end on a left side in FIG. 1 and connected to an alternating-current power system 3 (hereinafter, also referred to as a "system 3") on a side of another end (output side) on a right side in FIG. 1.

For example, the power conversion device (PCS: Power Conditioning System) 1 converts direct-current power supplied from the direct-current power supply 2 into alternating-current power and outputs the converted alternating-current power to a side of the system 3. Note that the power conversion device 1 is not limited to a power conversion device which converts direct-current power into alternating-current power and may be a power conversion device which converts alternating-current power into alternating-current power. In addition, the power conversion device 1 may be a power conversion device (PV-PCS: Photovoltaics-Power Conditioning System) for photovoltaics (PV). Alternatively, the power conversion device 1 may be an energy storage system-power conversion device (ESS-PCS: Energy Storage System-Power Conditioning System) for an energy storage system (ESS). Hereinafter, in the present specification, the power conversion device 1 will also be referred to as "PCS 1".

The direct-current power supply 2 is connected to one end side of the power conversion device 1 and supplies direct-current power to the power conversion device 1 via the one end side of the power conversion device 1. For example, the direct-current power supply 2 may be a photovoltaics (PV) device equipped with a solar panel, an energy storage system (ESS), a direct-current power supply system made up of a wind power generator and an alternating-current/direct-current converter, or the like. In addition, a component connected to the one end side of the power conversion device 1 is not limited to the direct-current power supply 2, and when the power conversion device 1 is a power conversion device which converts alternating-current power into alternating-current power, the component connected to the one end side of the power conversion device 1 may be an alternating-current power supply.

The alternating-current power system (system) 3 is a system which is connected to an output end being another end side of the power conversion device 1 and which integrates power generation, power transformation, power transmission, and power distribution for supplying alternating-current power output from the power conversion device 1 to power receiving equipment of utility customers and, for example, an unspecified load is connected to the system 3.

In addition, in FIG. 1, the power conversion device 1 includes an inverter circuit 11, a three-phase alternating-current circuit 12, an alternating-current reactor 13, an alternating-current switch 14, a capacitor circuit 15, and an alternating-current capacitor 16. Furthermore, the power conversion device 1 includes a current sensor 21, a first voltage sensor 22, a second voltage sensor 23, and the control device 30.

The power conversion device 1 has the three-phase alternating-current circuit 12 as an output circuit on an output side of the inverter 11 and the three-phase alternating-current circuit 12 is provided with the alternating-current reactor 13 and the alternating-current switch 14. The three-phase alternating-current circuit 12 branches to the capacitor circuit 15 via a branch point 12a between the alternating-current reactor 13 and the alternating-current switch 14 and the capacitor circuit 15 is connected to the alternating-current capacitor 16. In addition, in the capacitor circuit 15, the current sensor 21 is positioned between the branch point 12a and the alternating-current capacitor 16. Furthermore, in the alternating-current circuit 12, the first voltage sensor 22 is positioned between the alternating-current reactor 13 and the branch point 12a and the second voltage sensor 23 is positioned on a system 3 side of the alternating-current switch 14. While wirings will be omitted in the diagrams, the control device 30 is electrically connected to each element of the power conversion device 1.

For example, the inverter circuit (inverter) 11 is built up by a plurality of switching elements such as IGBTs (insulated gate bipolar transistors). One end side of the inverter circuit 11 is connected to the direct-current power supply 2 and another end side of the inverter circuit 11 being an output side is connected to the alternating-current reactor 13. For example, the inverter 11 is controlled by a pulse width modulation (PWM) signal which is a gate drive signal (gate signal) of a switching element generated by an inverter control unit 32A (refer to FIG. 10, FIG. 11, and the like) to be described later. The inverter 11 obtains direct-current power supplied from the direct-current power supply 2 from the one end side and, in accordance with control by the pulse width modulation signal (gate signal), converts the obtained direct-current power into alternating-current power, outputs the converted alternating-current power from the other end side being an output end, and supplies the alternating-current power to the three-phase alternating-current circuit 12. Hereinafter, in the present specification, the inverter circuit 11 will also be simply referred to as the "inverter 11". In addition, in the present specification, a pulse width modulation signal will also be referred to as a "PWM signal".

One end of the three-phase alternating-current circuit 12 is connected to the output end of the inverter 11 and another end of the three-phase alternating-current circuit 12 is connected to the system 3. For example, the three-phase alternating-current circuit 12 is a three-phase alternating-current circuit adopting a three-phase three-wire system which supplies, using three electric wires or cables, three-phase alternating-current power combining three single-phase alternating-current systems with mutually staggered current phases or voltage phases. Hereinafter, in the present specification, the three-phase alternating-current circuit 12 will also be simply referred to as the "alternating-current circuit 12".

The alternating-current reactor 13 is also referred to as an AC (alternating-current) reactor and is connected in series to the alternating-current circuit 12 on the output side of the inverter 11. Hereinafter, in the present specification, the alternating-current reactor 13 will also be referred to as the "AC reactor 13". For example, the AC reactor 13 is a smoothing element having an effect of reducing noise or an effect of suppressing a surge voltage. For example, together with the alternating-current capacitor 16 connected in an L shape via the branch point 12a, the AC reactor 13 constitutes an LC filter circuit (filter circuit) for reducing a ripple (vibration) which is generated when a switching element (not illustrated) of the inverter 11 is switched.

The alternating-current switch (alternating-current switchgear) 14 is also referred to as an AC switch and is provided in series closer to the system 3 side than the branch point 12a of the LC filter circuit described above in the alternating-current circuit 12. Hereinafter, in the present specification, the alternating-current switch 14 or the alternating-current switchgear 14 will also be referred to as the "AC switch 14". In accordance with a close instruction or an open instruction from the control device 30, a higher-level device (not illustrated), or an operator (not illustrated), the AC switch 14 closes (connects) or opens a section between the alternating-current circuit 12 and the system 3. The AC switch 14 is capable of interrupting an alternating current flowing towards the side of the system 3 and, when the AC switch 14 is opened, an outflow of the alternating-current power supplied from the inverter 11 to the system 3 is interrupted. During start-up (during activation) of the power conversion device 1, the AC switch 14 is opened when the power conversion device 1 is performing a voltage matching operation (synchronous control) with the side of the system 3 and is closed when a system interconnection operation is started.

The capacitor circuit 15 is a circuit which is branched via the branch point 12a between the AC reactor 13 and the alternating-current switch 14 in the alternating-current circuit 12, and one end of the capacitor circuit 15 is connected to the branch point 12a while another end side is connected to the alternating-current capacitor 16. In addition, in the capacitor circuit 15, the current sensor 21 is positioned between the branch point 12a and the alternating-current capacitor 16.

The alternating-current capacitor 16 is also referred to as an AC (alternating-current) capacitor or a filter capacitor and is an electronic component which stores or releases electricity (electric charges). Hereinafter, in the present specification, the alternating-current capacitor 16 will also be referred to as the "AC capacitor 16". For example, together with the AC reactor 13 connected in an L shape, the AC capacitor 16 constitutes an LC filter circuit (filter circuit) for reducing a ripple (vibration) which is generated when a switching element (not illustrated) of the inverter 11 is switched. By constituting the filter circuit together with the AC reactor 13, the AC capacitor 16 suppresses an outflow of higher harmonics (a harmonic current) toward the side of the system 3. The AC capacitor 16 may be at least one alternating-current capacitor which is disconnected from the circuit when a fault occurs.

For example, in order to increase capacitance or to satisfy a rated current, the AC capacitor 16 is configured by causing the capacitor circuit 15 to branch in plurality and connecting a plurality of AC capacitors 16a in parallel.

Each of the AC capacitors 16a has a security mechanism 16b. Note that, in the present embodiment, the AC capacitor 16 need not necessarily be connected in plurality in parallel and at least one AC capacitor 16 having the AC capacitor 16a and the security mechanism 16b may suffice.

The security mechanism 16b is, for example, a fuse, a switch, or the like and has a role of disconnecting the AC capacitor 16a from the circuit during a fault of the AC capacitor 16a or when an abnormality occurs in the AC capacitor 16a and internal pressure of the AC capacitor 16a rises. Note that the security mechanism 16b is not limited to a fuse, a switch, or the like provided separately from the AC capacitor 16a and may be a function or the like which is provided in the AC capacitor 16a itself and which is disconnected from the circuit in the event of a fault.

In addition, the security mechanism 16b may be a mechanism which individually disconnects the AC capacitor 16a from the circuit or a mechanism which disconnects each of predetermined packages of the AC capacitor 16 including a plurality of the AC capacitors 16a. In other words, for example, when the predetermined package of the AC capacitor 16 including a plurality of the AC capacitors 16a is connected in plurality in parallel or the like, the security mechanism 16b may be positioned for each of the predetermined packages of the AC capacitor 16.

The current sensor 21 is positioned between the branch point 12a and the alternating-current capacitor 16 in the capacitor circuit 15. For example, the current sensor 21 is a known alternating current meter, a known alternating current sensor, or the like. By positioning the current sensor 21 in the capacitor circuit 15, the current sensor 21 can measure a current flowing through the AC capacitor 16 during a voltage matching operation (during synchronous control) when the alternating-current switch 14 is opened. Furthermore, the current sensor 21 can also measure a current flowing through the AC capacitor 16 during a system interconnection operation when the alternating-current switch 14 is closed.

Figure 2:
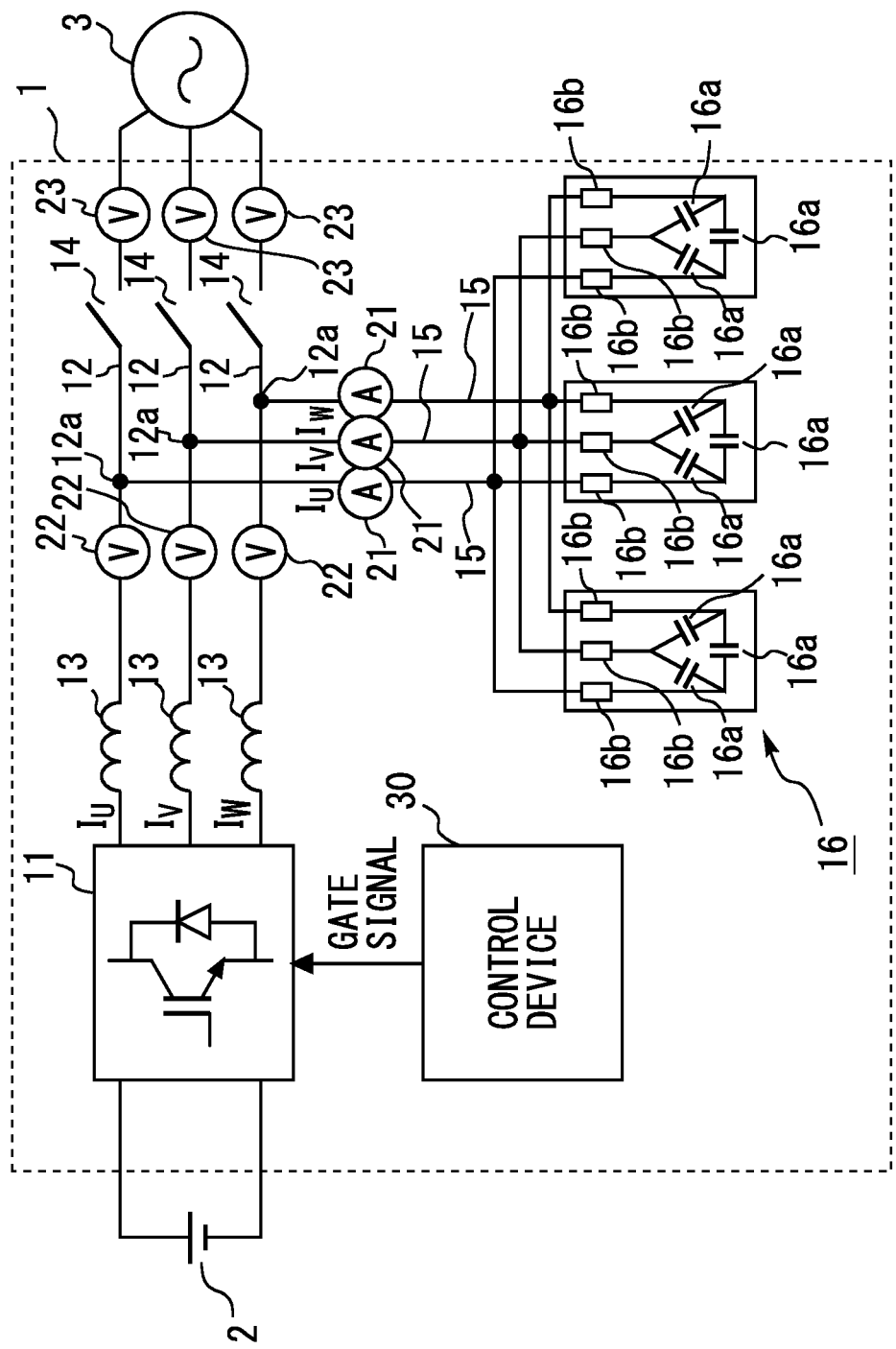
FIG. 2 is a diagram showing an example of an actual connection status of an alternating-current capacitor in the power conversion device shown in FIG. 1.

FIG. 2 is a diagram showing an example of an actual connection status of the alternating-current capacitor 16 in the power conversion device 1 shown in FIG. 1. In FIG. 2, same or similar components to those in FIG. 1 will be denoted by same reference signs and a detailed description thereof will be omitted or simplified.

As shown in FIG. 2, for example, the alternating-current circuit 12 is actually a three-phase alternating-current circuit adopting a three-phase three-wire system and each of the respective components including the AC capacitor 16 is actually provided in the three-phase alternating-current circuit 12. Note that, in FIG. 1 and the other drawings, the alternating-current circuit 12 and the respective components including the AC capacitor 16 are shown simplified for the sake of brevity of the drawings.

In FIG. 2, in order to increase capacitance or to satisfy a rated current, the capacitor circuits 15 of the respective phases (U phase, V phase, and W phase) of the three-phase alternating-current circuit 12 are branched in plurality and the AC capacitor 16 is connected in plurality and in parallel. While the capacitor circuit 15 of each phase is branched into three and three AC capacitors 16 are connected in parallel in each phase in FIG. 2, the number of branches and the number of parallel connections are not limited to this example. For example, the capacitor circuit 15 of each phase may be branched into five and five AC capacitors 16 may be connected in parallel in each phase. In addition, AC capacitors 16 of three phases may constitute a single package and a single AC capacitor package may be connected in parallel.

In addition, while the AC capacitors 16 are connected by a delta connection (A connection) in each AC capacitor package shown in FIG. 2, alternatively, the AC capacitors 16 may be connected by a star connection (Y connection) or by other connection methods. Furthermore, a mixture of AC capacitors 16 or AC capacitor packages using different connection methods may be provided and connected in parallel.

In other words, a method of parallel connection of the AC capacitors 16 is not particularly limited. In addition, in FIG. 2, while the security mechanism 16b is positioned for each AC capacitor 16a, the security mechanism 16b may instead be positioned for each AC capacitor package as described above. Note that a location where the security mechanism 16b is positioned is not limited to the location shown in FIG. 2 and may be any location where the security mechanism 16b can disconnect the AC capacitor 16 or 16a from the circuit in the event of a fault of the AC capacitor 16 or 16a.

In addition, as shown in FIG. 2, the current sensor 21 is positioned so as to be capable of detecting current values $I_U$, $I_V$, and $I_W$ of alternating currents of the three phases in the capacitor circuit 15. Note that locations where the current sensor 21 is positioned are not limited to the locations shown in FIG. 2 and the current sensor 21 may be positioned at locations where the current values $I_U$, $I_V$, and $I_W$ of the alternating currents of the three phases which flow through each AC capacitor package can be detected. In other words, for example, the current sensor 21 may be positioned for each AC capacitor package. The current values $I_U$, $I_V$, and $I_W$ of alternating currents of three phases detected by the current sensor 21 are obtained by the control device 30.

Returning to FIG. 1, for example, the first voltage sensor 22 is positioned between the inverter 11 and the branch point 12a to the capacitor circuit 15 in the alternating-current circuit 12 on the output side of the inverter 11. For example, the first voltage sensor 22 is a known alternating-current voltmeter, a known alternating-current voltage sensor, or the like and detects a voltage value $V_i$ of the output voltage of the inverter 11. For example, the first voltage sensor 22 detects the voltage value $V_i$ of the output voltage of the inverter 11 during a voltage matching operation (synchronous control). The voltage value $V_i$ of the output voltage detected by the first voltage sensor 22 is obtained by the control device 30. Note that a location where the first voltage sensor 22 is positioned may be any location which enables the voltage value $V_i$ of the output voltage of the inverter 11 to be detected and is not limited to the location shown in FIG. 1.

For example, the second voltage sensor 23 is positioned between the alternating-current switch 14 and the system 3 in the alternating-current circuit 12 on the output side of the inverter 11. For example, the second voltage sensor 23 is a known alternating-current voltmeter, a known alternating-current voltage sensor, or the like and detects voltage values $V_U$, $V_V$, and $V_W$ of the system voltage of the three phases. The voltage values $V_U$, $V_V$, and $V_W$ detected by the second voltage sensor 23 are obtained by the control device 30. Note that a location where the second voltage sensor 23 is positioned may be any location which enables the voltage values $V_U$, $V_V$, and $V_W$ of the system voltage of the three phases on the side of the system 3 to be detected and is not limited to the location shown in FIG. 1.

For example, the control device 30 is provided inside or outside the power conversion device 1 and, while wirings and the like have been omitted in the drawing, the control device 30 is electrically connected in a wired or wireless manner to each element of the power conversion device 1 including the inverter 11. Alternatively, the control device 30 may be realized as a function of an inverter control circuit (not illustrated).

For example, the control device 30 includes a processor 91 (refer to FIG. 13) to be described later such as a CPU (central processing unit), an MPU (micro processing unit), or a GPU (graphics processing unit) which operates when a program is executed. The control device 30 includes a storage unit 40 (refer to FIG. 3 and the like), a memory 92 (refer to FIG. 13), and the like to be described later and, for example, the control device 30 operates the processor 91 by executing a predetermined program stored in the storage unit 40 or the memory 92 and comprehensively controls operations of the power conversion device 1. For example, the control device 30 may operate in accordance with an instruction from a higher-level device (not illustrated), an instruction from an operator via an operating unit (not illustrated), or the like. The control device 30 detects a fault of the AC capacitor 16 using a detection logic to be described later based on the current value of at least any phase (for example, the current value $I_U$ of the U phase) among the current values $I_U$, $I_V$, and $I_W$ of alternating currents of the three phases detected by the current sensor 21 (refer to FIGS. 4 to 6 and the like). Note that the higher-level device (not illustrated) is a device which comprehensively monitors and controls a plurality of the power conversion devices 1 and which is connected in a wired or wireless manner to each of the power conversion devices 1.

Figure 3:
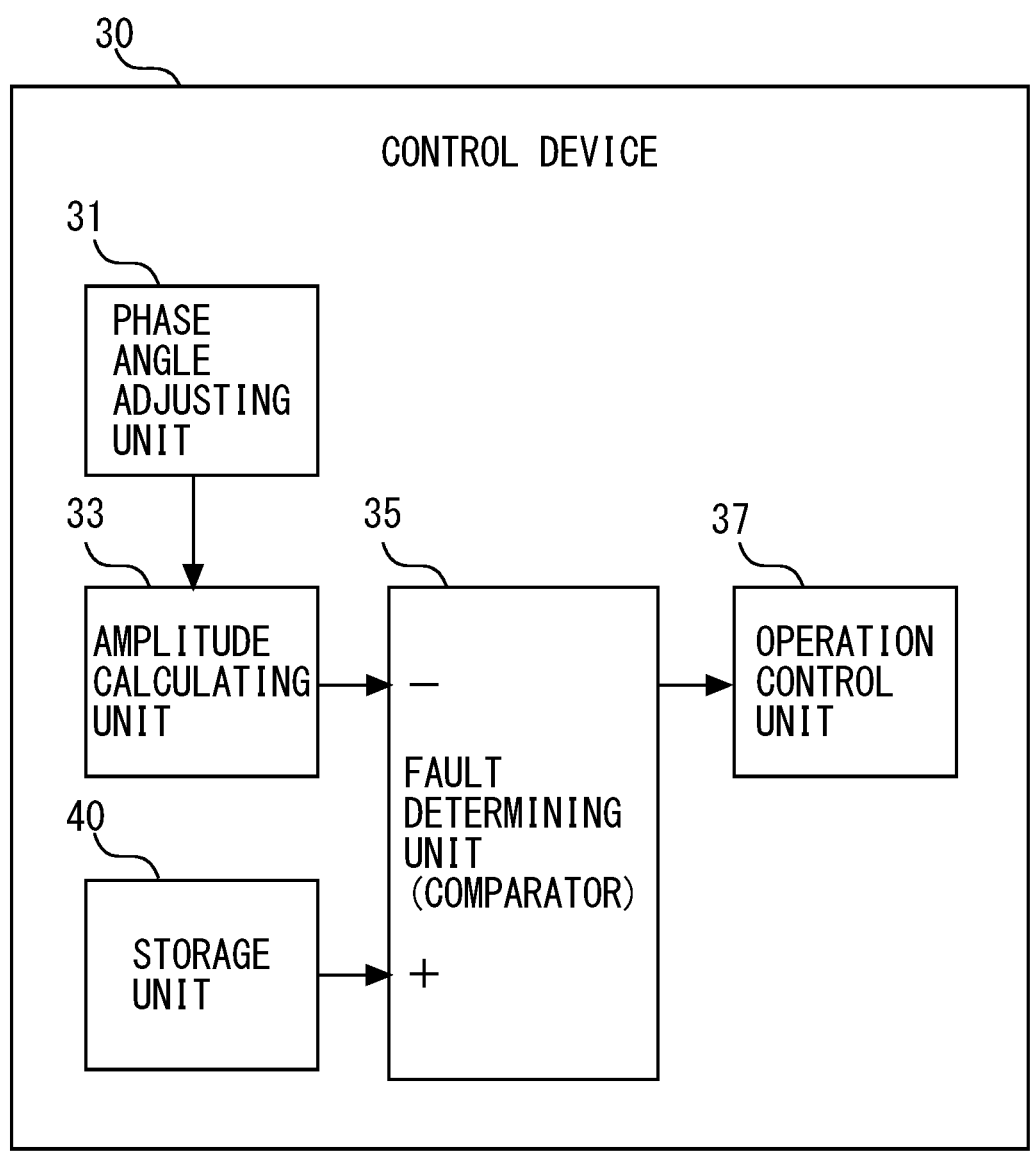
FIG. 3 is a diagram showing an example of a configuration of the control device in the power conversion device shown in FIGS. 1 and 2.

FIG. 3 is a diagram showing an example of a configuration of the control device 30 in the power conversion device 1 shown in FIGS. 1 and 2.

The control device 30 includes the storage unit 40 and, for example, the control device 30 functions as each unit described below by executing a predetermined program stored in the storage unit 40 or the memory 92 (refer to FIG. 13) to be described later. The control device 30 functions as a phase angle adjusting unit 31, an amplitude calculating unit 33, a fault determining unit 35, and an operation control unit 37. Each of the functions described above may be realized by a program executed by the processor 91 (refer to FIG. 13) to be described later in a processing circuit 90 (refer to FIG. 13) to be described later included in the control device 30 or realized by hardware 93 (refer to FIG. 13) to be described later. The phase angle adjusting unit 31, the amplitude calculating unit 33, the fault determining unit 35, and the operation control unit 37 execute a predetermined program to perform processing described below.

The phase angle adjusting unit 31 obtains voltage values $V_U$, $V_V$, and $V_W$ which are measured values of the system voltage of the three phases (the U phase, the V phase, and the W phase) on the side of the system 3 from the second voltage sensor 23. For example, the phase angle adjusting unit 31 subjects the obtained voltage values $V_U$, $V_V$, and $V_W$ of the system voltage to a three-phase/two-phase conversion (dq conversion) based on an arbitrary phase angle θ and obtains a d-axis voltage $V_d$ and a q-axis voltage $V_q$. The phase angle adjusting unit 31 subjects the obtained d-axis voltage $V_d$ and the obtained q-axis voltage $V_q$ to PLL (phase locked loop) control and adjusts a rate of change of the phase angle θ so that the q-axis voltage $V_q$ becomes sufficiently small (becomes 0) with respect to the d-axis voltage $V_d$. Accordingly, a frequency and a phase of the phase angle θ match a frequency and a phase of the system voltage and a direction of a system voltage vector matches the d-axis direction on dq coordinates.

Based on the adjusted phase angle θ, the phase angle adjusting unit 31 subjects the voltage values $V_U$, $V_V$, and $V_W$ of the three phases of the system voltage to a three-phase/two-phase conversion (dq conversion) and outputs a d-axis component and a q-axis component. Accordingly, on the dq coordinate axes, the q-axis is to be oriented in a direction phase-advanced by 90 degrees with respect to the d-axis. The phase angle adjusting unit 31 subjects the voltage values $V_U$, $V_V$, and $V_W$ of the system voltage to a three-phase/two-phase conversion (dq conversion) based on the adjusted phase angle θ and obtains a d-axis voltage $V_d$ and a q-axis voltage $V_q$. The phase angle adjusting unit 31 outputs the adjusted phase angle θ to the amplitude calculating unit 33.

The amplitude calculating unit 33 obtains current values $I_U$, $I_V$, and $I_W$ which are measured values of the alternating currents of the three respective phases (the U phase, the V phase, and the W phase) which flow through the AC capacitor 16 from the current sensor 21. Note that the amplitude calculating unit 33 may only obtain a current value of at least one phase among the current values $I_U$, $I_V$, and $I_W$ which are measured values of the alternating currents of the three respective phases (the U phase, the V phase, and the W phase) from the current sensor 21. In addition, the amplitude calculating unit 33 calculates predetermined current components of the respective phases by multiplying the obtained current values $I_U$, $I_V$, and $I_W$ of the respective phases by values sin θ and cos θ based on the phase angle θ having been adjusted by the phase angle adjusting unit 31.

Furthermore, the amplitude calculating unit 33 extracts a direct-current component of each phase via a predetermined low-pass filter (LPF) from the calculated predetermined current component of each phase. Moreover, based on the extracted direct-current component of each phase, the amplitude calculating unit 33 calculates a value of an amplitude of a frequency component (a fundamental wave component) of an alternating current of each phase. The amplitude calculating unit 33 outputs the calculated value of the amplitude of the frequency component (the fundamental wave component) of the alternating current of each phase to the fault determining unit 35. Details of a method of calculating the value of the amplitude of the fundamental wave component of the alternating current of each phase described above will be provided later (refer to FIG. 4 to FIG. 6 and the like).

The fault determining unit (comparator) 35 performs a magnitude comparison between each of the values of the amplitudes of the frequency components (the fundamental wave components) of the alternating currents of the respective phases calculated by the amplitude calculating unit 33 and a predetermined determination value obtained from the storage unit 40. In addition, when at least any one of the values of the amplitudes of the alternating currents of the respective phases calculated by the amplitude calculating unit 33 is smaller than the predetermined determination value obtained from the storage unit 40, the fault determining unit 35 determines that a fault of the AC capacitor 16 has occurred. In other words, for example, when an open fault of at least one of the plurality of AC capacitors 16 occurs, the value of the amplitude of at least any one phase connected to the AC capacitor 16 in which the fault has occurred becomes smaller than at normal time. Therefore, by performing a magnitude comparison between the value of the amplitude of each phase calculated by the amplitude calculating unit 33 and the predetermined determination value, the fault determining unit 35 detects the decreased amplitude value and determines a fault. When the fault determining unit 35 determines that a fault has occurred in the AC capacitor 16, the fault determining unit 35 outputs "1" being a determination result to the effect that a fault has occurred to the operation control unit 37. For example, the fault determining unit 35 may output "1" being a determination result to the effect that a fault has occurred to a higher-level device (not illustrated) or the like or may output a warning, an alarm, or the like to a display unit, an operating unit, or the like (not illustrated) of the power conversion device 1.

When the operation control unit 37 obtains "1" being a determination result to the effect that a fault of the AC capacitor 16 has occurred from the fault determining unit 35 during synchronous control prior to closing the alternating-current switch 14, the operation control unit 37 issues an operation instruction to each unit of the power conversion device 1 to stop the power conversion device 1. On the other hand, when the operation control unit 37 obtains "1" while the alternating-current switch 14 is closed, such as during a system interconnection operation, the operation control unit 37 issues an operation instruction to each unit of the power conversion device 1 to stop the power conversion device 1 and, at the same time, issues an operation instruction to open the alternating-current switch 14.

For example, the storage unit 40 is a volatile or non-volatile storage medium such as an HDD (hard disk drive), an SSD (solid state drive), a DRAM (dynamic random access memory), or other semiconductor memories. For example, the storage unit 40 stores a program necessary for operations of each unit of the control device 30 and, at the same time, read and write of various kinds of information are performed by each unit of the control device 30. In addition, for example, the storage unit 40 stores values obtained by each sensor such as the current sensor 21, various arithmetic expressions, coefficients, and the like used in calculations by the amplitude calculating unit 33, the predetermined determination value, and the like used in the magnitude comparison by the fault determining unit 35.

The storage unit 40 is connected by, for example, a bus (system bus) (not illustrated) or the like to each unit of the control device 30 so that various kinds of information can be input and output. Note that the storage unit 40 may be provided outside the control device 30 and connected to the control device 30 in a wired or wireless manner and may be an external storage medium such as a memory card or a DVD (digital versatile disc), an online storage, or the like. In addition, the storage unit 40 may be common to the memory 92 (refer to FIG. 13) to be described later.

Operation of First Embodiment

Figure 4:
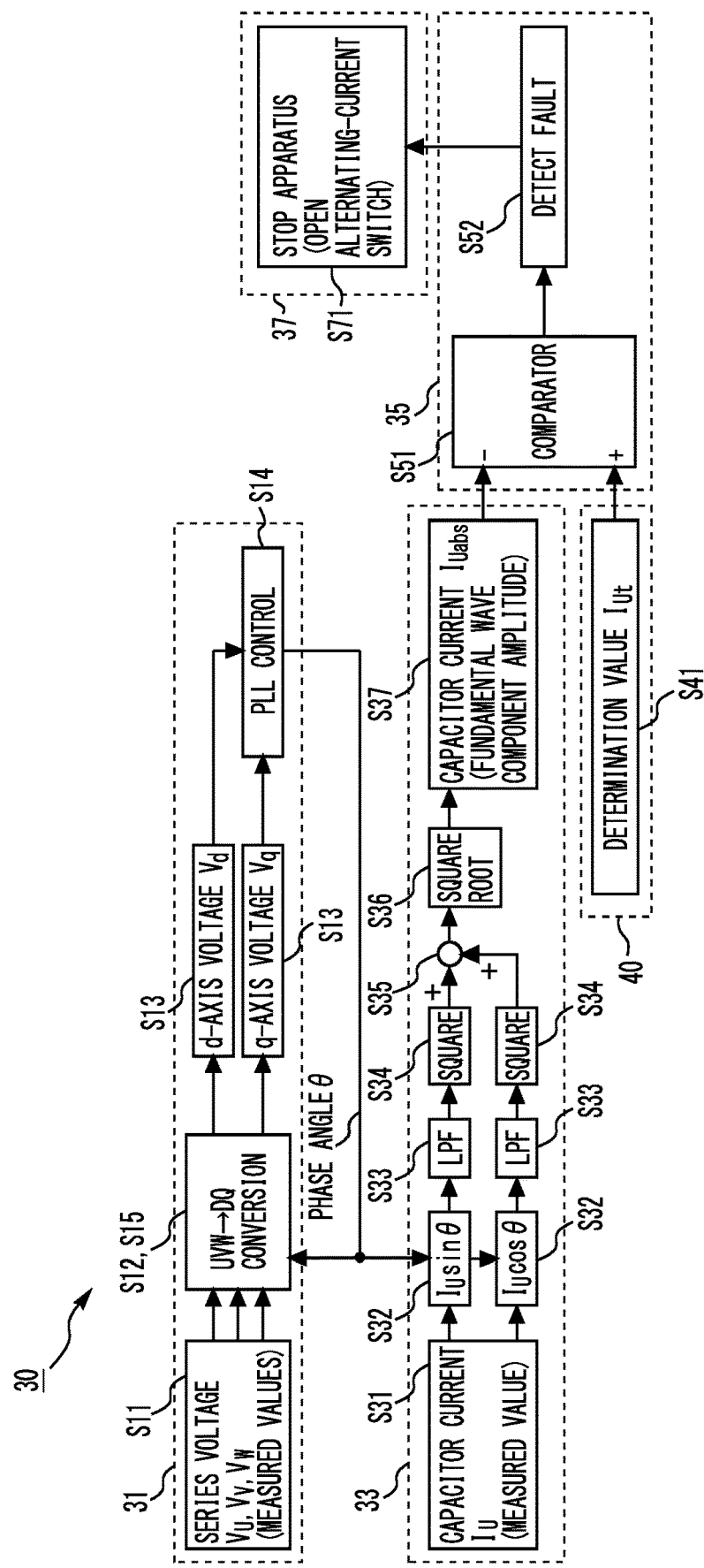
FIG. 4 is a diagram showing an example of a fault detection operation of the control device shown in FIGS. 1 to 3.

FIG. 4 is a diagram showing an example of a fault detection operation of the control device 30 shown in FIGS. 1 to 3. The operation shown in FIG. 4 is started during a voltage matching operation (synchronous control) upon start-up (reception of a start-up command) of the power conversion device 1 or during a system interconnection operation of the power conversion device 1. In other words, the operation shown in FIG. 4 is started regardless of whether during a voltage matching operation (synchronous control) upon start-up of the power conversion device 1 during which the AC switch 14 on the side of the system 3 is open or during a system interconnection operation of the power conversion device 1 during which the AC switch 14 on the side of the system 3 is closed. Note that the operation shown in FIG. 4 may be performed constantly, performed at predetermined intervals, or performed in accordance with, for example, an instruction from the control device 30, an instruction from a higher-level device (not illustrated), or an instruction from an operator (not illustrated).

In step S11, the phase angle adjusting unit 31 of the control device 30 obtains voltage values $V_U$, $V_V$, and $V_W$ which are measured values of the system voltage of the three phases (the U phase, the V phase, and the W phase) on the side of the system 3 from the second voltage sensor 23 and causes a transition of the processing to step S12.

In step S12, the phase angle adjusting unit 31 subjects the obtained voltage values $V_U$, $V_V$, and $V_W$ of the system voltage to a three-phase/two-phase conversion (dq conversion) based on, for example, an arbitrary phase angle θ and obtains a d-axis voltage $V_d$ and a q-axis voltage $V_q$, and causes a transition of the processing to step S13.

In step S13, the phase angle adjusting unit 31 obtains the obtained d-axis voltage $V_d$ and q-axis voltage $V_q$ and causes a transition of the processing to step S14.

In step S14, the phase angle adjusting unit 31 performs PLL (phase locked loop) control with respect to the obtained d-axis voltage $V_d$ and q-axis voltage $V_q$. In addition, the phase angle adjusting unit 31 adjusts a rate of change of the phase angle θ so that the q-axis voltage $V_q$ becomes sufficiently small (becomes 0) with respect to the d-axis voltage $V_d$. Accordingly, a frequency and a phase of the phase angle θ are to match a frequency and a phase of the system voltage and a direction of a system voltage vector is to match the d-axis direction on dq coordinates. The phase angle adjusting unit 31 outputs the adjusted phase angle θ and causes a transition of the processing to step S15. Furthermore, the phase angle adjusting unit 31 also outputs the adjusted phase angle θ to the amplitude calculating unit 33.

In step S15, the phase angle adjusting unit 31 subjects the voltage values $V_U$, $V_V$, and $V_W$ of the system voltage of the three phases to a three-phase/two-phase conversion (dq conversion) based on the adjusted phase angle θ and obtains a d-axis component (d-axis voltage $V_d$) and a q-axis component (q-axis voltage $V_q$). Accordingly, on the dq coordinate axes, the q-axis is to be oriented in a direction phase-advanced by 90 degrees with respect to the d-axis. In addition, the phase angle adjusting unit 31 is to cause a transition of the processing to step S13 and repetitively perform the processing of steps S13 to S15 during the operation of the power conversion device 1.

In step S31, the amplitude calculating unit 33 of the control device 30 obtains each of current values $I_U$, $I_V$, and $I_W$ which are measured values of the alternating currents of the three respective phases (the U phase, the V phase, and the W phase) which flow through the AC capacitor 16 from the current sensor 21, and causes a transition of the processing to step S32. Note that the current sensor 21 measures the current values $I_U$, $I_V$, and $I_W$ constantly or at predetermined intervals and the amplitude calculating unit 33 obtains the current values $I_U$, $I_V$, and $I_W$ constantly or at predetermined intervals.

FIG. 4 shows a flow of a processing operation with respect to the current value $I_U$ as an example. Therefore, while the current value $I_U$ will be described hereinafter as an example, similar processing is to be performed with respect to the other current values $I_V$ and $I_W$.

In step S32, the amplitude calculating unit 33 obtains current values $I_U$, $I_V$, and $I_W$ which are measured values of the alternating currents of the respective phases which flow through the AC capacitor 16 and a value based on the phase angle θ adjusted by the PLL control of step S14. In addition, the amplitude calculating unit 33 multiplies the obtained current values $I_U$, $I_V$, and $I_W$ which are measured values of the alternating currents of the respective phases which flow through the AC capacitor 16 by the value based on the phase angle θ adjusted by the PLL control of step S14 to calculate predetermined current components. Specifically, to describe the case of the current value $I_U$ as an example, the amplitude calculating unit 33 multiplies the current value $I_U$ by sin θ being a value based on the phase angle θ to calculate $I_U$ sin θ being a predetermined current component. In addition, the amplitude calculating unit 33 multiplies the current value $I_U$ by cos θ being a value based on the phase angle θ to calculate $I_U$ cos θ being a predetermined current component. Subsequently, the amplitude calculating unit 33 causes a transition of the processing to step S33.

Note that, in step S14, the phase angle adjusting unit 31 has adjusted the phase angle θ so that the q-axis voltage $V_q$ becomes sufficiently small (becomes 0) with respect to the d-axis voltage $V_d$. Therefore, as a result of the PLL control in step S14, a frequency and a phase of 0 match a frequency and a phase of the system voltage and a direction of a vector of the system voltage matches the d-axis direction on dq coordinates.

In step S33, using a predetermined low-pass filter (LPF) for extracting a direct-current component, the amplitude calculating unit 33 extracts a direct-current component from $I_U$ sin θ which is the predetermined current component obtained in step S32. Accordingly, a component in a same phase as sin θ among the current value $I_U$ is extracted. In addition, using a predetermined low-pass filter (LPF) for extracting a direct-current component, the amplitude calculating unit 33 extracts a direct-current component from $I_U$ cos θ which is the predetermined current component obtained in step S32. Accordingly, a component in a same phase as cos θ among the current value $I_U$ is extracted. Subsequently, the amplitude calculating unit 33 causes a transition of the processing to step S34.

In step S34, the amplitude calculating unit 33 obtains a squared value of the direct-current component included in $I_U$ sin θ (a component in the same phase as sin θ among the current value $I_U$) extracted in step S33. In addition, the amplitude calculating unit 33 obtains a squared value of the direct-current component included in $I_U$ cos θ (a component in the same phase as cos θ among the current value $I_U$) extracted in step S33. Subsequently, the amplitude calculating unit 33 causes a transition of the processing to step S35.

In step S35, the amplitude calculating unit 33 obtains a sum of the squared value of the direct-current component of $I_U$ sin θ and the squared value of the direct-current component of $I_U$ cos θ obtained in step S34 and causes a transition of the processing to step S36.

In step S36, the amplitude calculating unit 33 calculates a capacitor current $I_{Uabs}$ which is a square root of the sum (a sum of squares of the respective extracted components) obtained in step S35 and causes a transition of the processing to step S37. By executing the processing from step S31 to step S36 and calculating the square root of the sum of squares of the respective extracted components, the amplitude calculating unit 33 can calculate a value of the amplitude of a frequency component (fundamental wave component) of the phase angle θ among the current value $I_U$. In addition, by executing the processing from step S31 to step S36 and calculating the square root of the sum of squares of the respective extracted components, for example, the amplitude calculating unit 33 can make the capacitor current $I_{Uabs}$ a positive value even when the current value $I_U$ has a negative value.

In step S37, the amplitude calculating unit 33 obtains the capacitor current $I_{Uabs}$ (fundamental wave component amplitude) calculated in step S36 and outputs the capacitor current $I_{Uabs}$ to the fault determining unit (comparator) 35. Alternatively, the amplitude calculating unit 33 may output the capacitor current before obtaining the square root in step S36 (the sum obtained in step S35) to the fault determining unit (comparator) 35.

In step S41, the control device 30 obtains a predetermined determination value $I_{Ut}$ stored in, for example, the storage unit 40, and outputs the predetermined determination value $I_{Ut}$ to the fault determining unit (comparator) 35. The predetermined determination value $I_{Ut}$ is determined based on various experiments, simulations, various conditions, a predetermined calculation method, or the like and is stored in, for example, the storage unit 40.

Note that the predetermined determination value $I_{Ut}$ may be based on an instruction from the control device 30, a higher-level device (not illustrated), an operator (not illustrated), or the like. In addition, the predetermined determination value $I_{Ut}$ may be multiplied by, for example, a value (for example, 0.8) representing a predetermined fault detection level which is a value smaller than 1 so that, even when the capacitor current $I_{Uabs}$ contains a certain amount of error, the error can be allowed and a fault of the AC capacitor 16 can be detected. When the capacitor current (sum) prior to obtaining a square root has been output in step S37, the predetermined determination value $I_{Ut}$ must be a value which takes the calculation of squares into consideration.

In step S51, the fault determining unit (comparator) 35 obtains the capacitor current $I_{Uabs}$ (fundamental wave component amplitude) obtained by the amplitude calculating unit 33 and the predetermined determination value $I_{Ut}$ stored in the storage unit 40. In addition, the fault determining unit (comparator) 35 performs a magnitude comparison of the capacitor current $I_{Uabs}$ (fundamental wave component amplitude) and the predetermined determination value $I_{Ut}$ to determine whether or not a fault of the AC capacitor 16 has occurred. Furthermore, when the capacitor current $I_{Uabs}$ (fundamental wave component amplitude) is smaller than the determination value $I_{Ut}$, the fault determining unit 35 determines that a fault of the AC capacitor 16 has occurred. In other words, for example, since the capacitor current $I_{Uabs}$ (fundamental wave component amplitude) becomes smaller than at normal time when an open fault of at least one of the plurality of AC capacitors 16 occurs, the fault determining unit 35 detects that the capacitor current $I_{Uabs}$ (fundamental wave component amplitude) has decreased and determines the occurrence of a fault. When the fault determining unit 35 determines whether or not a fault of the AC capacitor 16 has occurred, the fault determining unit 35 causes a transition of the processing to step S52.

In step S52, when the fault determining unit 35 determines that a fault of the AC capacitor 16 has occurred, the fault determining unit 35 outputs "1" being a determination result to the effect that a fault has occurred to the operation control unit 37. When the fault determining unit 35 determines that a fault of the AC capacitor 16 has not occurred, the fault determining unit 35 may either output "0" being a determination result to the effect that a fault has not occurred to the operation control unit 37 or may output nothing until a determination that a fault has occurred is made.

The fault determining unit 35 may output "1" being a determination result to the effect that a fault has occurred to a fault information reporting unit 36A (refer to FIG. 10, FIG. 11, and the like) to be described later. In this case, the fault information reporting unit 36A (refer to FIG. 10, FIG. 11, and the like) to be described later may report fault information by, for example, reporting (outputting) the fault information to a higher-level device or the like (not illustrated) or reporting a warning, an alarm, or the like to a display screen, an operating panel, or the like (not illustrated) of the power conversion device 1.

Figure 5:
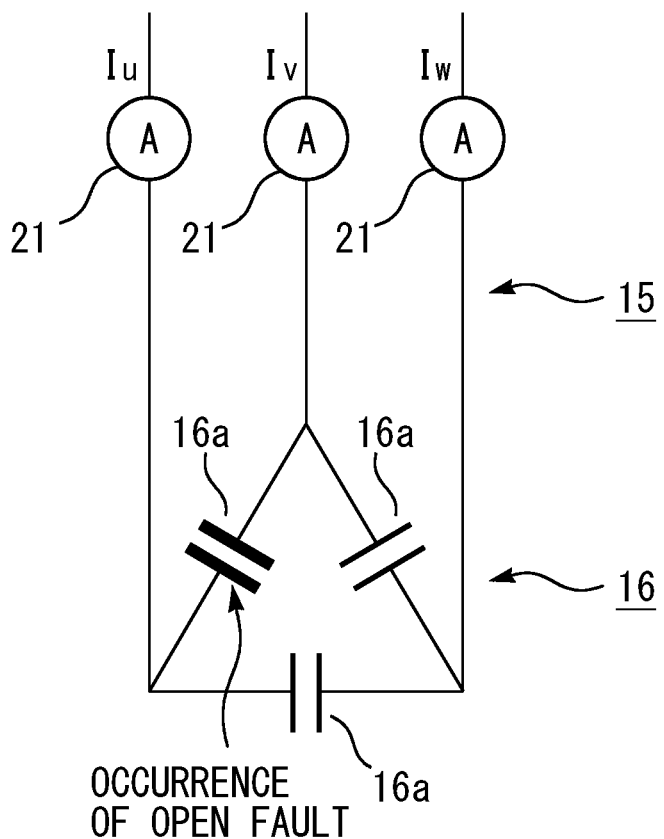
FIG. 5 is a diagram schematically showing a state where an open fault has occurred in an AC capacitor between U and V of a Δ connection in the AC capacitor shown in FIGS. 1 and 2.

FIG. 5 is a diagram schematically showing a state where an open fault has occurred in the AC capacitor 16a between U and V of a Δ connection in the AC capacitor 16 shown in FIGS. 1 and 2.

In FIG. 5, a three-phase alternating current is flowing through the capacitor circuit 15 and current values $I_U$, $I_V$, and $I_W$ of the respective phases have been obtained by the current sensor 21. In addition, in FIG. 5, an open fault has occurred in the AC capacitor 16a between the U phase and the V phase (between U and V) of the AC capacitor 16 connected by a Δ connection.

Figure 6:
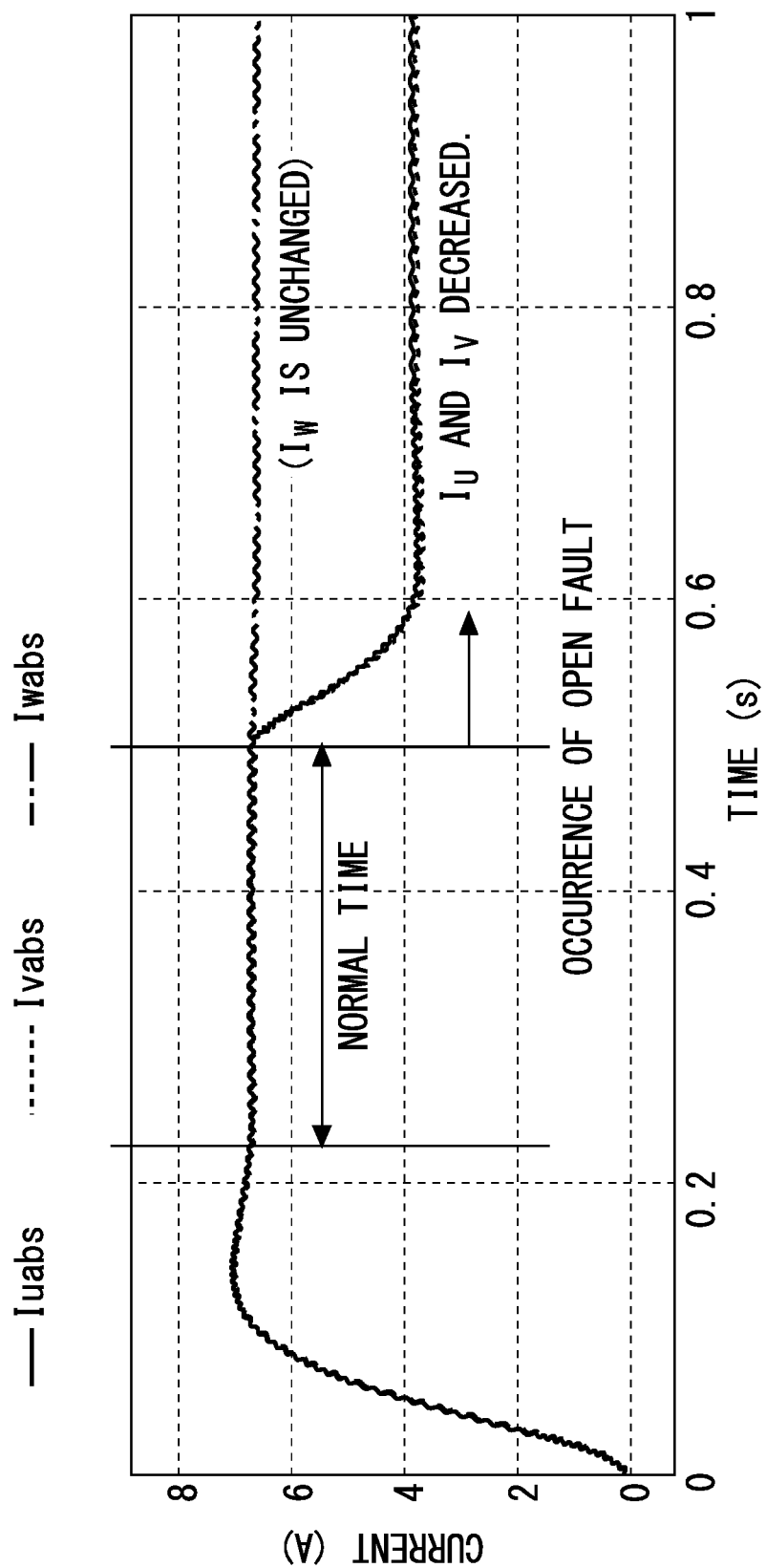
FIG. 6 is a diagram showing a simulated waveform of a capacitor current of each phase in the case shown in FIG. 5.

FIG. 6 is a diagram showing a simulated waveform of a capacitor current of each phase in the case shown in FIG. 5. In FIG. 6, an axis of ordinate represents a current (A) and an axis of abscissa represents time (s). In addition, a solid line represents the capacitor current $I_{Uabs}$ of the U phase, a dashed line represents a capacitor current $I_{Vabs}$ of the V phase, and an alternate long and short dash line represents a capacitor current $I_{Wabs}$ of the W phase. In other words, the diagram shown in FIG. 6 shows values obtained by executing processing of step S31 to step S37 shown in FIG. 4 with respect to the current values $I_U$, $I_V$, and $I_W$ of the respective phases having been obtained by the current sensor 21 shown in FIG. 5.

In FIG. 6, an open fault has occurred in the AC capacitor 16a between the U phase and the V phase (between U and V) shown in FIG. 5 once 0.5 (s) of time elapsed. Therefore, as shown in FIG. 6, at normal time until 0.5 (s) of time elapses, the capacitor currents $I_{Uabs}$, $I_{Vabs}$, and $I_{Wabs}$ of the three phases all shift at an approximately constant value near 0.65 (A).

On the other hand, at the time of occurrence of the open fault once 0.5 (s) of time elapsed, the capacitor current $I_{Uabs}$ of the U phase represented by the solid line and the capacitor current $I_{Vabs}$ of the V phase represented by the dashed line have dropped to 0.4 (A) or lower. Note that, as shown in FIG. 6, even after the time of occurrence of the open fault once 0.5 (s) of time elapsed, the capacitor current $I_{Wabs}$ of the W phase represented by the alternate long and short dash line still shifts at an approximately constant value near 0.65 (A).

Accordingly, for example, by setting the determination values $I_{Ut}$, $I_{Vt}$, and $I_{Wt}$ between 0.4 (A) and 0.6 (A) and performing a magnitude comparison with the capacitor currents $I_{Uabs}$, $I_{Vabs}$, and $I_{Wabs}$ of the three phases, whether or not a fault has occurred in the AC capacitor 16 can be determined. Therefore, in the present embodiment, the fault determining unit 35 performs a magnitude comparison between the capacitor currents $I_{Uabs}$, $I_{Vabs}$, and $I_{Wabs}$ and the determination values $I_{Ut}$, $I_{Vt}$, and $I_{Wt}$ to determine whether or not a fault has occurred in the AC capacitor 16 (any of the AC capacitors 16a).

When the capacitor current (sum) prior to obtaining a square root has been output in step S37, the graph shown in FIG. 6 conceivably extends in a direction of the axis of ordinate. Therefore, in this case, the determination values $I_{Ut}$, $I_{Vt}$, and $I_{Wt}$ must also be determination values which take a calculation of squares into consideration (determination values which take an extension in the direction of the axis of ordinate into consideration).

In addition, while aspects differ between a case of a Δ connection and a case of a Y connection, even in the case of a Y connection, since the current value of any of the phases conceivably drops, whether or not a fault has occurred in the AC capacitor 16 can be determined by the method described in the present embodiment.

Returning to FIG. 4, in step S71, when the operation control unit 37 of the control device 30 obtains "1" being a determination result to the effect that a fault of the AC capacitor 16 has occurred from the fault determining unit 35, the operation control unit 37 issues an operation instruction to each unit of the power conversion device 1 to stop the power conversion device 1. Note that, when the operation control unit 37 obtains "1" being a determination result to the effect that a fault of the AC capacitor 16 has occurred while the alternating-current switch 14 is closed, such as during a system interconnection operation, the operation control unit 37 further issues an operation instruction to open the alternating-current switch 14. Accordingly, the operation control unit 37 can stop the power conversion device 1 and suppress spreading of the fault to normal AC capacitors 16a and an outflow of higher harmonics toward the side of the system 3.

When the operation control unit 37 receives an operation instruction via the operating unit from a higher-level device (not illustrated) or an operator (not illustrated), the operation control unit 37 may issue an operation instruction to stop the power conversion device 1 (and open the alternating-current switch 14). Note that, when the operation control unit 37 has not obtained a determination result to the effect that a fault has occurred from the fault determining unit 35 upon obtaining information of a positive synchronization determination during synchronous control, the operation control unit 37 may issue an operation instruction to the alternating-current switch 14 to close the switch and start a system interconnection operation.

Accordingly, the control device 30 ends the fault detection operation shown in FIG. 4. Note that, as described above, the fault detection operation shown in FIG. 4 may be performed constantly, performed at predetermined intervals, or performed in accordance with, for example, an instruction from the control device 30, an instruction from a higher-level device (not illustrated), or an instruction from an operator (not illustrated).

Figure 7A:
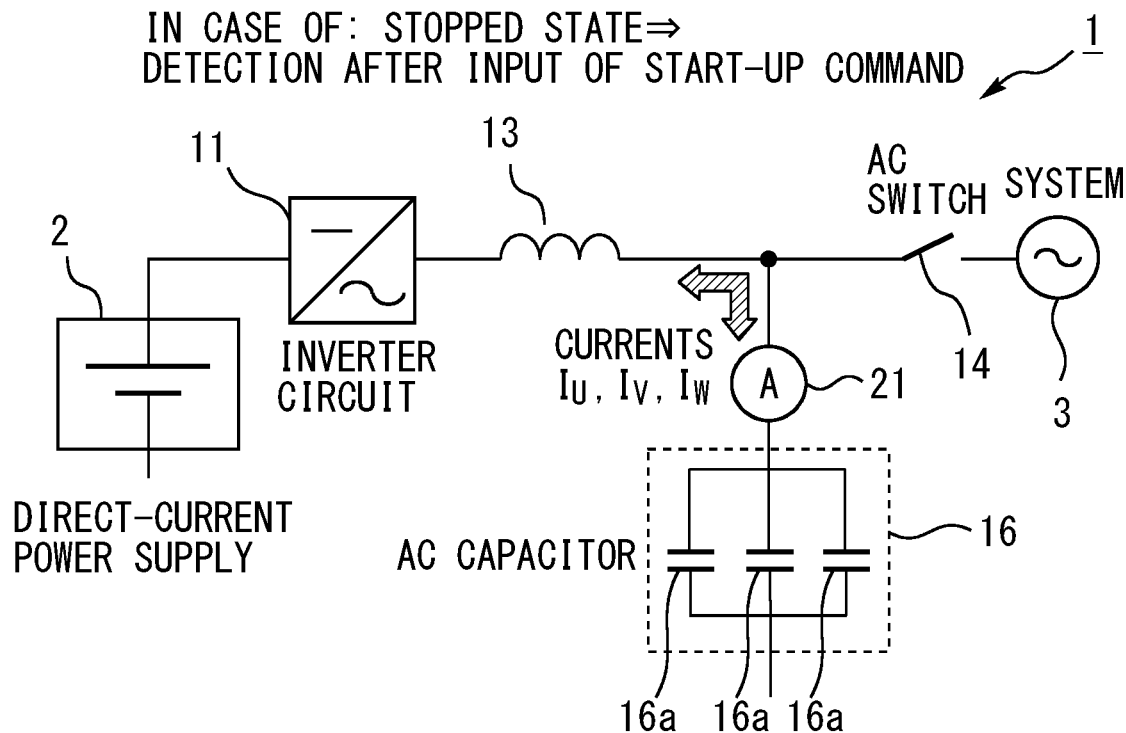
FIG. 7 is a diagram showing an example of an operation after input of a start-up command of the power conversion device shown in FIGS. 1 to 6.
Figure 7B:
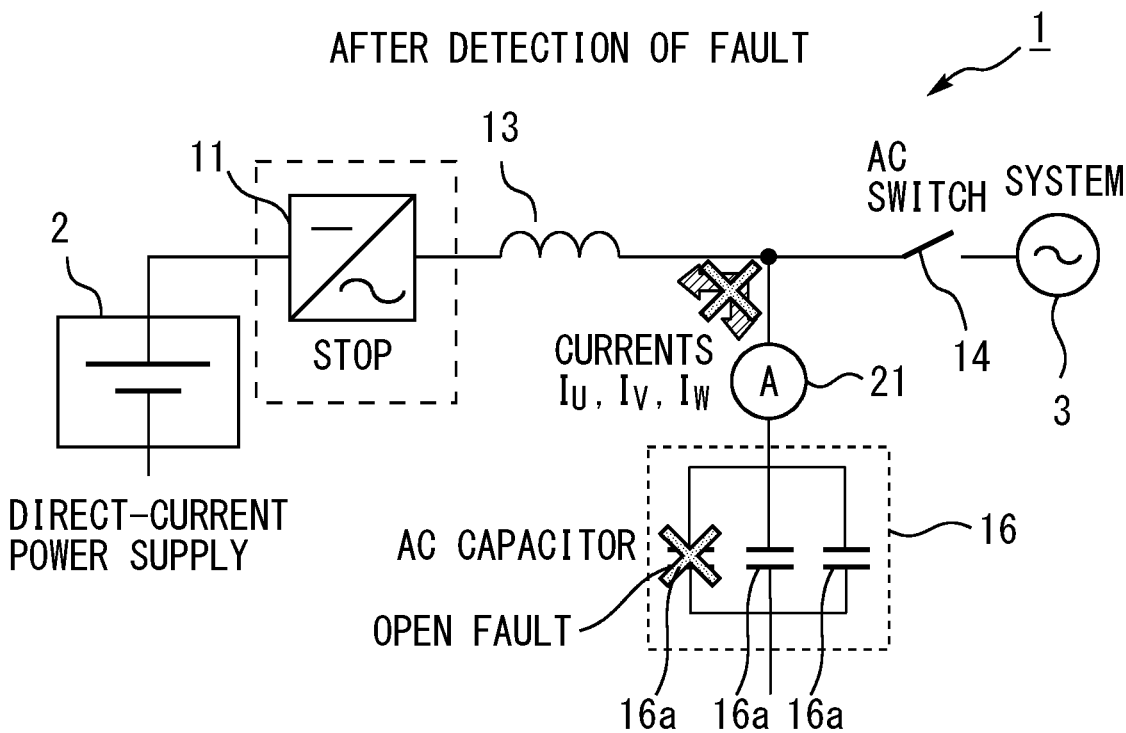

FIG. 7 is a diagram showing an example of an operation after input of a start-up command of the power conversion device 1 shown in FIGS. 1 to 6. FIG. 7A is a diagram showing a state during a voltage matching operation (synchronous control) after the input of a start-up command of the power conversion device 1 when the AC capacitor 16 is normal. FIG. 7B is a diagram showing a state during a voltage matching operation (synchronous control) after the input of a start-up command of the power conversion device 1 when an open fault has occurred in a part of the AC capacitor 16.

Note that, in FIG. 7, in reality, three phases' worth of the alternating-current circuit 12 is connected to the output side of the inverter 11 and three phases' worth of the AC reactor 13, the alternating-current switch 14, the AC capacitor 16, and the like are positioned as shown in FIG. 2. In addition, in reality, the AC capacitor 16 is connected in plurality in parallel in each phase as shown in FIG. 2. However, the respective elements including those described above have been omitted or shown simplified for the sake of brevity of the drawing.

In FIG. 7A, when the AC capacitor 16 is normal, immediately after receiving a start-up command from a stopped state, the power conversion device 1 drives the inverter 11 (the inverter circuit 11) to perform a voltage matching operation (synchronous control) and attempts to synchronize voltages before and after the alternating-current switch 14. At this point, since the alternating-current switch 14 is open, alternating-current power output from the inverter circuit 11 does not flow out toward the side of the system 3 but a current flows through the AC capacitor 16.

In this case, the current values $I_U$, $I_V$, and $I_W$ of the capacitor currents flowing through the AC capacitors 16 of the respective phases are constantly detected by the current sensors 21 of the respective phases which are positioned in the capacitor circuit 15. In addition, at this point, the control device 30 is constantly performing operations from step S11 to step S51 shown in FIG. 4. In this case, normally, the currents of the current values $I_U$, $I_V$, and $I_W$ flow through the AC capacitors 16. In this case, the capacitor currents $I_{Uabs}$, $I_{Vabs}$, and $I_{Wabs}$ of the three phases shift at an approximately constant value as described earlier.

In FIG. 7B, even when an open fault has occurred in a part of the AC capacitor 16, the power conversion device 1 performs a similar operation as in FIG. 7A. In this case, when an open fault has occurred in a part of the AC capacitor 16, since at least any of the capacitor currents $I_{Uabs}$, $I_{Vabs}$, and $I_{Wabs}$ of the three phases decreases, a fault of the AC capacitor 16 is detected by the control device 30.

In other words, the control device 30 determines that a fault has occurred in the AC capacitor 16 (S51) and outputs "1" being a determination result to the effect that a fault has occurred in the AC capacitor 16 to the operation control unit 37 (S52). In this case, the operation control unit 37 is to obtain "1" being a determination result to the effect that a fault of the AC capacitor 16 has occurred during a voltage matching operation of the power conversion device 1. In this case, the operation control unit 37 causes the power conversion device 1 to stop (S71) and causes application of voltage to the AC capacitor 16 to stop.

Accordingly, when a fault is detected during a voltage matching operation (synchronous control), the power conversion device 1 can be stopped (start-up can be prevented) prior to a system interconnection operation. Accordingly, spreading of the fault to normal AC capacitors 16a and an outflow of higher harmonics toward the side of the system 3 can be suppressed.

Figure 8A:
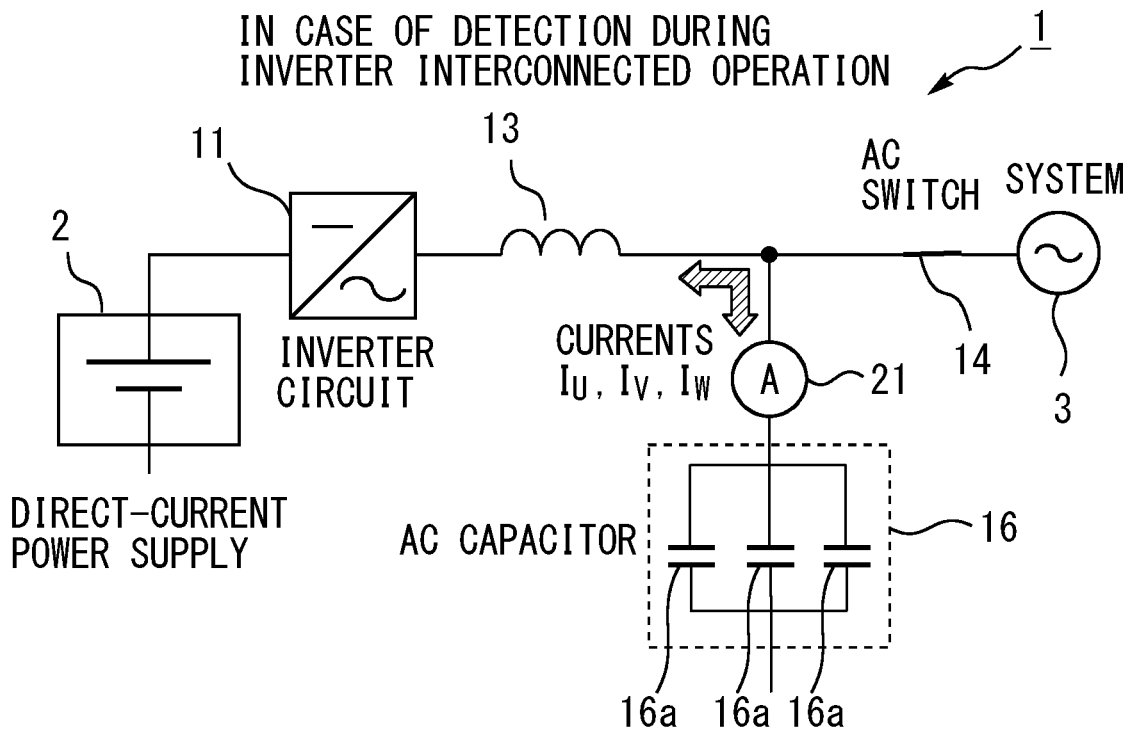
FIG. 8 is a diagram showing an example of an operation during an inverter interconnection operation of the power conversion device shown in FIGS. 1 to 6.
Figure 8B:
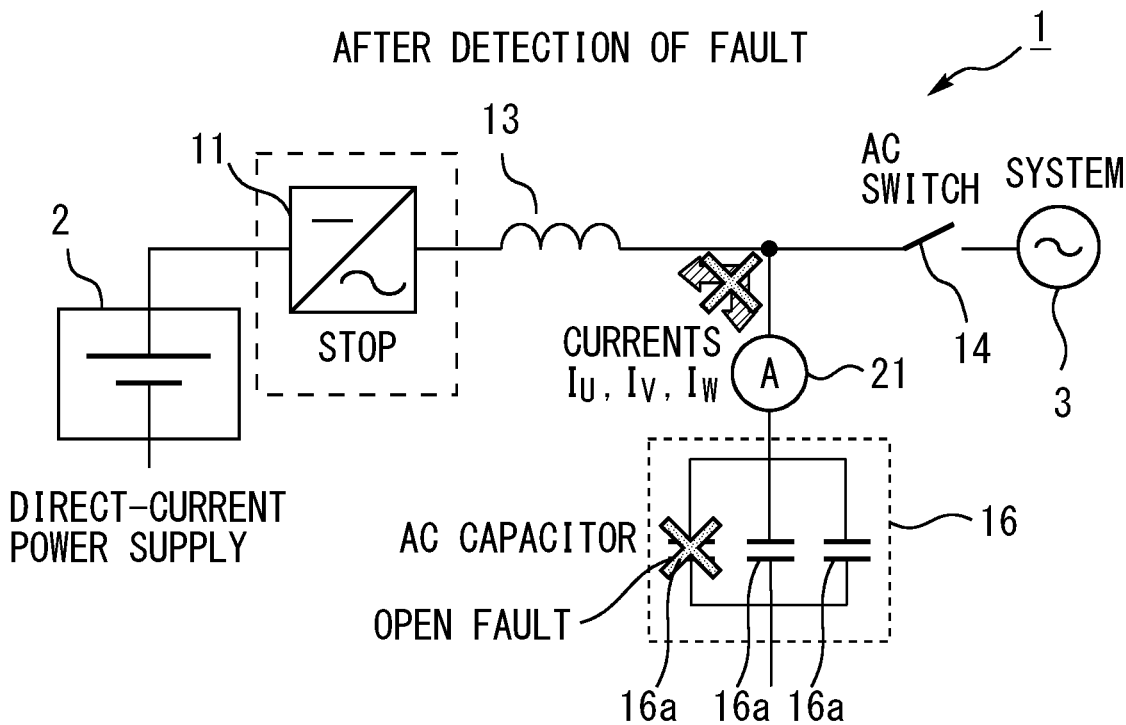

FIG. 8 is a diagram showing an example of an operation during an inverter interconnection operation of the power conversion device 1 shown in FIGS. 1 to 6. FIG. 8A is a diagram showing a state during an inverter interconnection operation (during a system interconnection operation) of the power conversion device 1 when the AC capacitor 16 is normal. FIG. 8B is a diagram showing a state during an inverter interconnection operation (during a system interconnection operation) of the power conversion device 1 when an open fault has occurred in a part of the AC capacitor 16. Even in FIG. 8, the respective elements have been omitted or shown simplified for the sake of brevity of the drawing in a similar manner to FIG. 7.

As shown in FIG. 8A, since the current sensor 21 is positioned in the capacitor circuit 15, even when the AC switch 14 of the power conversion device 1 has been closed and the inverter circuit 11 is being driven, the current sensor 21 can detect the current values $I_U$, $I_V$, and $I_W$ of the capacitor currents.

In this case, even when the AC switch 14 of the power conversion device 1 has been closed and the inverter circuit 11 is being driven, the current values $I_U$, $I_V$, and $I_W$ of the capacitor currents flowing through the AC capacitors 16 of the respective phases are constantly detected by the current sensors 21 of the respective phases. Even in this case, the control device 30 is constantly performing operations from step S11 to step S51 shown in FIG. 4 in a similar manner to that shown in FIG. 7. In this case, normally, the currents of the current values $I_U$, $I_V$, and $I_W$ flow through the AC capacitors 16 in a similar manner to that shown in FIG. 7 and the capacitor currents $I_{Uabs}$, $I_{Vabs}$, and $I_{Wabs}$ of the three phases shift at an approximately constant value.

In FIG. 8B, even when an open fault has occurred in a part of the AC capacitor 16, the power conversion device 1 performs a similar operation as in FIG. 8A. In this case, in a similar manner to that shown in FIG. 7, when an open fault has occurred in a part of the AC capacitor 16, since at least any of the capacitor currents $I_{Uabs}$, $I_{Vabs}$, and $I_{Wabs}$ of the three phases decreases as described earlier, a fault of the AC capacitor 16 is detected by the control device 30.

In other words, in a similar manner to that shown in FIG. 7, the control device 30 determines that a fault has occurred in the AC capacitor 16 (S51) and outputs "1" being a determination result to the effect that a fault has occurred in the AC capacitor 16 to the operation control unit 37 (S52). In this case, the operation control unit 37 is to obtain that "1" being a determination result to the effect that a fault of the AC capacitor 16 has occurred during an inverter interconnection operation (during a system interconnection operation) of the power conversion device 1. In this case, the operation control unit 37 causes the AC switch 14 of the alternating-current circuit 12 to be opened and the power conversion device 1 to stop (S71), and causes application of voltage to the AC capacitor 16 to stop. Stopping means used at this point is not limited to those used by the operation control unit 37 and operations of the power conversion device 1 may be stopped on predetermined software or the AC switch 14 may be manually opened by an operator (not illustrated).

Accordingly, even when a fault is detected during an inverter interconnection operation (during a system interconnection operation), spreading of the fault to normal AC capacitors 16a and an outflow of higher harmonics toward the side of the system 3 can be suppressed.

Operation and Effect of First Embodiment

As described above, according to the first embodiment shown in FIGS. 1 to 8, the fault determining unit 35 performs a magnitude comparison between the capacitor currents $I_{Uabs}$, $I_{Vabs}$, and $I_{Wabs}$ (fundamental wave component amplitudes) obtained by the amplitude calculating unit 33 and the determination values $I_{Ut}$, $I_{Vt}$, and $I_{Wt}$. In addition, when the capacitor currents $I_{Uabs}$, $I_{Vabs}$, and $I_{Wabs}$ (fundamental wave component amplitudes) are smaller than the determination values $I_{Ut}$, $I_{Vt}$, and $I_{Wt}$, the fault determining unit 35 determines that a fault of the AC capacitor 16 has occurred and outputs a determination result (S51, S52). In other words, in the first embodiment shown in FIGS. 1 to 8, a fault of the AC capacitor 16 is detected based on a current component of each phase which flows through the AC capacitor 16. Accordingly, fault information of the AC capacitor 16 can be reported or the power conversion device 1 can be stopped and an outflow of higher harmonics to the side of the system 3 and spreading of the fault to normal AC capacitors 16a can be suppressed.

In addition, according to the first embodiment shown in FIGS. 1 to 8, the current sensor 21 is positioned in the capacitor circuit 15. Therefore, even during a voltage matching operation of the power conversion device 1 (when the alternating-current switch 14 is open) or during a system interconnection operation (when the alternating-current switch 14 has been closed), the current values $I_U$, $I_V$, and $I_W$ of currents (capacitor currents) which flow through the AC capacitor 16 can be distinguished and measured. Accordingly, in the first embodiment shown in FIGS. 1 to 8, whether or not a fault of the AC capacitor 16 has occurred can be determined even during a voltage matching operation of the power conversion device 1 (when the alternating-current switch 14 is open) or during a system interconnection operation (when the alternating-current switch 14 has been closed). In addition, accordingly, even during a voltage matching operation of the power conversion device 1 (when the alternating-current switch 14 is open) or during a system interconnection operation (when the alternating-current switch 14 has been closed), spreading of the fault to normal AC capacitors 16a and an outflow of higher harmonics to the side of the system 3 can be suppressed.

In addition, according to the first embodiment shown in FIGS. 1 to 8, since the current sensor 21 positioned in the capacitor circuit 15 only measures small currents which flow through the AC capacitor 16 (the capacitor circuit 15), a sensor with a small rated current can be used. Therefore, the current sensor 21 with a small rated current is able to more accurately measure capacitor currents which are small currents than a current sensor with a large rated current such as that positioned in the alternating-current circuit 12. In addition, a smaller and more inexpensive current sensor can be used as the current sensor 21 with a small rated current as compared to a current sensor with a large rated current such as that positioned in the alternating-current circuit 12.

Furthermore, according to the first embodiment shown in FIGS. 1 to 8, a current sensor 21 is positioned in the capacitor circuit 15. Accordingly, for example, even when a current sensor is only positioned closer to the side of the system 3 than the alternating-current switch 14 of the alternating-current circuit 12 as specifications, a fault of the AC capacitor 16 can be determined and the power conversion device 1 can be stopped. Therefore, even in such cases, an outflow of higher harmonics to the side of the system 3 and spreading of the fault to normal AC capacitors 16a can be suppressed.

Configuration of Second Embodiment

Figure 9:
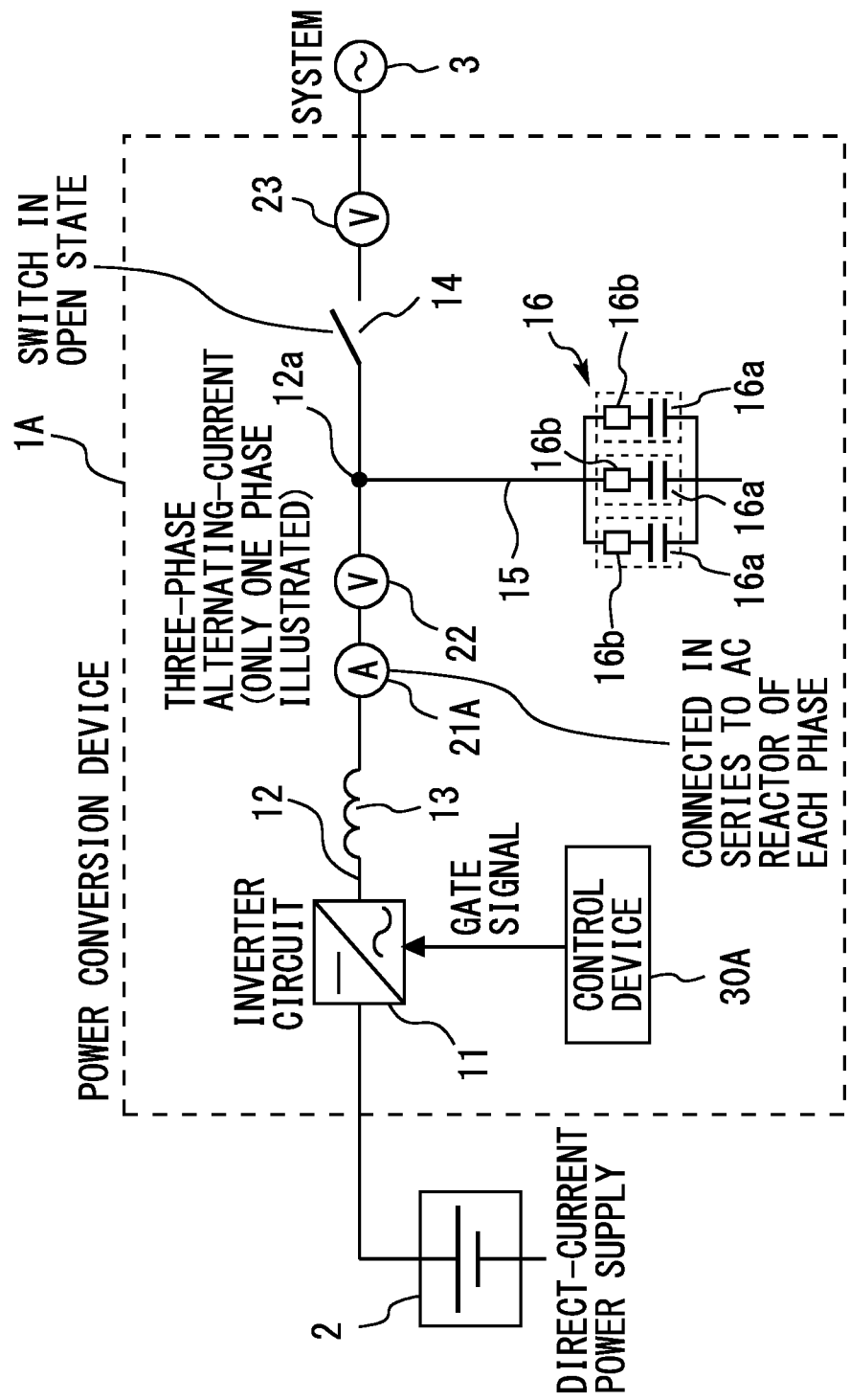
FIG. 9 is a diagram showing an example of a configuration of a control device and a power conversion device according to a second embodiment.

FIG. 9 is a diagram showing an example of a configuration of a control device 30A and a power conversion device 1A according to a second embodiment. Note that, in FIG. 9, same components as those of the embodiment shown in FIGS. 1 to 8 will be denoted by same reference signs and a detailed description thereof will be omitted or simplified. In a similar manner to FIG. 2, in the configuration shown in FIG. 9, the alternating-current circuit 12 is actually a three-phase alternating-current circuit adopting a three-phase three-wire system and each of the respective components including the AC capacitor 16 is actually provided in the three-phase alternating-current circuit 12. However, even in FIG. 9, the respective elements are shown simplified for the sake of brevity of the drawing in a similar manner to FIG. 1.

In the embodiment shown in FIG. 9, unlike the embodiment shown in FIGS. 1 to 8, while the current sensor 21 is not positioned in the capacitor circuit 15, the current sensor 21A is positioned in the alternating-current circuit 12. In the embodiment shown in FIG. 9, the current sensor 21A can measure current values $I_U$, $I_V$, and $I_W$ of currents (capacitor currents) which flow through the AC capacitor 16 only during a voltage matching operation (during synchronous control) when the alternating-current switch 14 is opened.

The current sensor 21A is positioned between the inverter 11 and the branch point 12a to the capacitor circuit 15 in the alternating-current circuit 12 on the output side of the inverter 11 so as to be connected in series to the alternating-current reactor 13. For example, the current sensor 21A is a known alternating current meter, a known alternating current sensor, or the like and detects the current values $I_U$, $I_V$, and $I_W$ of output currents of three phases in the power conversion device 1A. The current values $I_U$, $I_V$, and $I_W$ detected by the current sensor 21A are obtained by the control device 30A.

The current sensor 21A need only be connected in series to the AC reactor 13 in the alternating-current circuit 12 and may be connected in any connection order. However, the current sensor 21A needs to be provided between the inverter 11 and the branch point 12a in the alternating-current circuit 12. By providing the current sensor 21A at this position, the current values $I_U$, $I_V$, and $I_W$ of currents flowing through the AC capacitor 16 can be measured during a voltage matching operation (during synchronous control) when the alternating-current switch 14 is opened. In reality, since the current sensor 21A is already positioned at the position described above as specifications in many of the power conversion devices 1, in the present embodiment, the existing current sensor 21A which has already been positioned can be used.

The control device 30A can detect a fault of the AC capacitor 16 based on the current values $I_U$, $I_V$, and $I_W$ measured by the current sensor 21A only during a voltage matching operation (during synchronous control). Details of components or functions and operations of the control device 30A will be provided later (refer to FIG. 10, FIG. 11, and the like).

Figure 10:
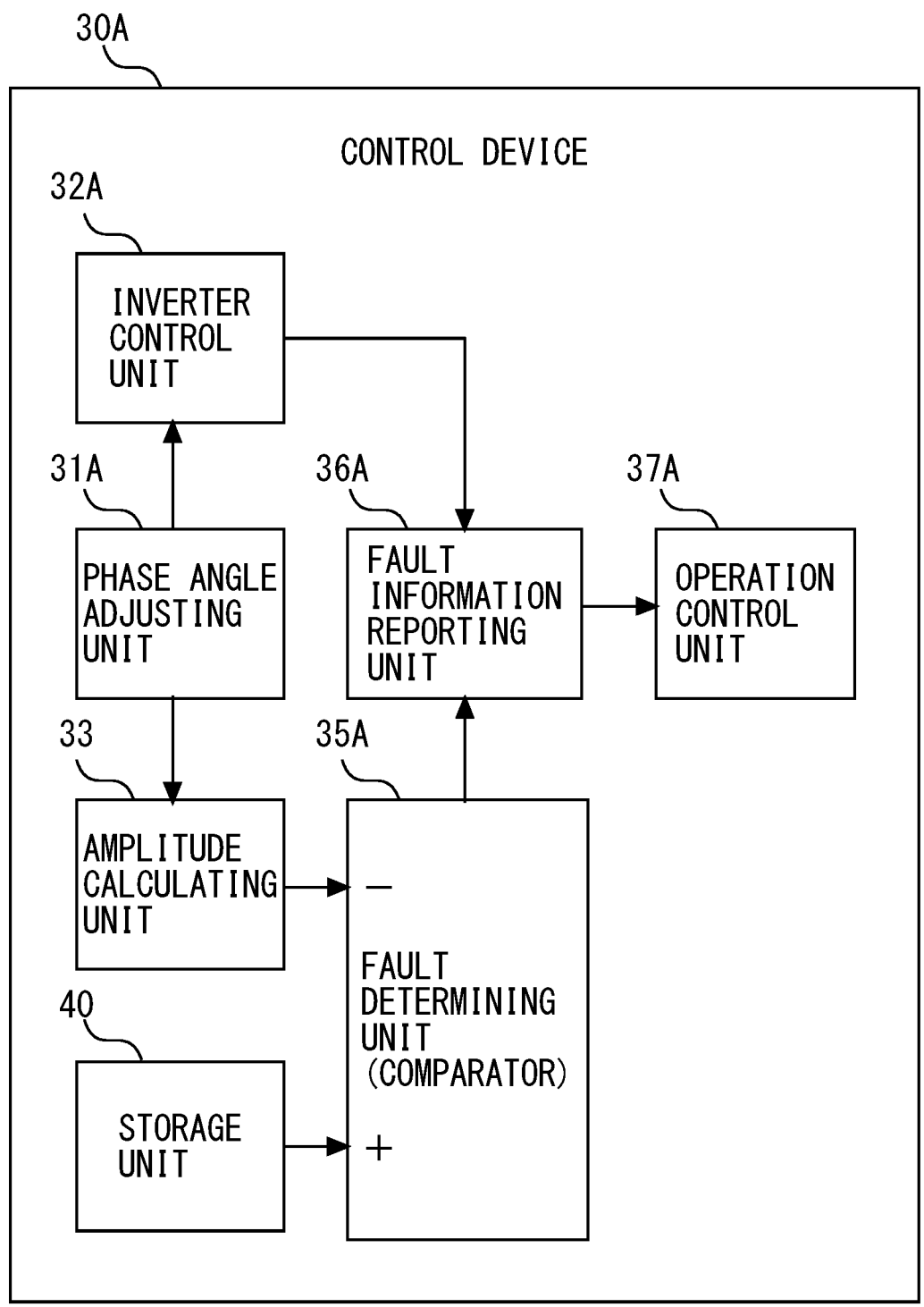
FIG. 10 is a diagram showing an example of a configuration of the control device in the power conversion device shown in FIG. 9.

FIG. 10 is a diagram showing an example of a configuration of the control device 30A in the power conversion device 1A shown in FIG. 9. Note that, even in FIG. 10, same components as those of the embodiment shown in FIGS. 1 to 8 will be denoted by same reference signs and a detailed description thereof will be omitted or simplified.

The control device 30A includes the storage unit 40 and, for example, the control device 30A functions as each unit described below by executing a predetermined program stored in the storage unit 40 or the memory 92 (refer to FIG. 13) to be described later. The control device 30A functions as a phase angle adjusting unit 31A, an inverter control unit 32A, the amplitude calculating unit 33, a fault determining unit 35A, a fault information reporting unit 36A, and an operation control unit 37A. The phase angle adjusting unit 31A, the inverter control unit 32A, the amplitude calculating unit 33, the fault determining unit 35A, the fault information reporting unit 36A, and the operation control unit 37A execute a predetermined program to perform processing described below.

The phase angle adjusting unit 31A outputs obtained d-axis voltage $V_d$ and q-axis voltage $V_q$ to the inverter control unit 32A. Other components or functions of the phase angle adjusting unit 31A are similar to those of the phase angle adjusting unit 31 in the embodiment shown in FIGS. 1 to 8.

The inverter control unit 32A obtains the d-axis voltage $V_d$ and q-axis voltage $V_q$ obtained based on the phase angle θ adjusted by the phase angle adjusting unit 31A. With respect to the obtained d-axis voltage $V_d$ and q-axis voltage $V_q$, the inverter control unit 32A performs a two-phase/three-phase conversion (inverse conversion) via a predetermined filter and obtains inverter output voltage command values $V_U^*$, $V_V^*$, and $V_W^*$. The inverter control unit 32A subjects the obtained inverter output voltage command values $V_U^*$, $V_V^*$, and $V_W^*$ to PWM (pulse width modulation) control and generates a gate signal.

The inverter control unit 32A controls a switching element (not illustrated) of the inverter 11 according to the generated gate signal and causes a voltage matching operation (synchronous control) of the power conversion device 1A to be performed. Note that information on whether or not the power conversion device 1A is performing a voltage matching operation (synchronous control) is obtained by the fault information reporting unit 36A from the inverter control unit 32A when appropriate.

When the fault determining unit (comparator) 35A determines that a fault of the AC capacitor 16 has occurred, the fault determining unit 35 outputs "1" being a determination result to the effect that a fault has occurred to the fault information reporting unit 36A. Other components or functions of the fault determining unit 35A are similar to those of the fault determining unit 35 in the embodiment shown in FIGS. 1 to 8.

The fault information reporting unit 36A obtains information on whether or not the power conversion device 1A is performing a voltage matching operation (synchronous control) from the inverter control unit 32A when appropriate. When the fault determining unit 35A determines that a fault of the AC capacitor has occurred, the fault information reporting unit 36A obtains "1" being a determination result to the effect that a fault has occurred from the fault determining unit 35A. When the fault information reporting unit 36A obtains "1" being a determination result to the effect that a fault of the AC capacitor 16 has occurred from the fault determining unit 35A after acquiring information to the effect that the power conversion device 1A is performing a voltage matching operation (synchronous control), the fault information reporting unit 36A reports fault information. The fault information reporting unit 36A reports fault information by, for example, outputting the fault information to a higher-level device or the like (not illustrated) or reporting a warning, an alarm, or the like to a display unit, an operating unit, or the like (not illustrated) of the power conversion device 1A. In addition, the fault information reporting unit 36A also reports the fault information to the operation control unit 37A.

When the operation control unit 37A obtains a report of fault information of the AC capacitor 16 from the fault information reporting unit 36A, the operation control unit 37A issues an operation instruction to each unit of the power conversion device 1A to stop the power conversion device 1A and causes the power conversion device 1A to stop before closing the alternating-current switch 14. Note that, when the operation control unit 37A has not obtained a report of fault information of the AC capacitor 16 from the fault information reporting unit 36A upon obtaining information of a positive synchronization determination from the inverter control unit 32A, the operation control unit 37A may issue an operation instruction to close the alternating-current switch 14 and start a system interconnection operation.

Operation of Second Embodiment

Figure 11:
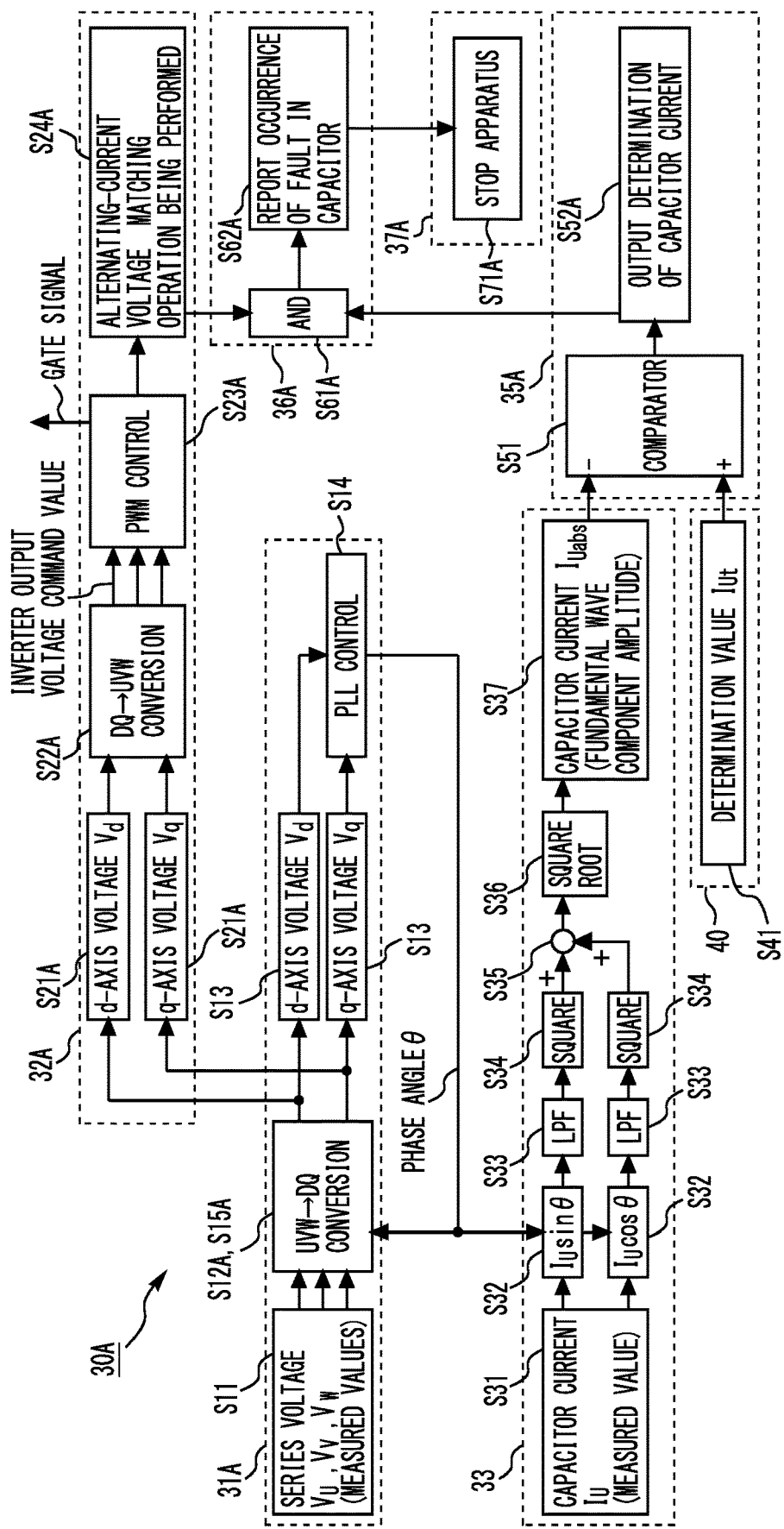
FIG. 11 is a diagram showing an example of a fault detection operation of the control device shown in FIGS. 9 and 10.

FIG. 11 is a diagram showing an example of a fault detection operation of the control device 30A shown in FIGS. 9 and 10. Note that, even in FIG. 11, a same operation (processing step) as that of the embodiment shown in FIGS. 1 to 8 will be denoted by a same reference sign (processing step number) and a detailed description thereof will be omitted or simplified.

The operation shown in FIG. 11 is started upon start-up (reception of a start-up command) of the power conversion device 1A. In other words, the operation shown in FIG. 11 is started during a voltage matching operation (synchronous control) upon start-up (activation) of the power conversion device 1A during which the AC switch 14 on the side of the system 3 is open. Note that the operation shown in FIG. 11 may be performed constantly during a voltage matching operation (synchronous control), performed at predetermined intervals, or performed in accordance with, for example, an instruction from the control device 30A, an instruction from a higher-level device (not illustrated), or an instruction from an operator (not illustrated).

In step S12A and step S15A, the phase angle adjusting unit 31A also outputs obtained d-axis voltage $V_d$ and q-axis voltage $V_q$ to the inverter control unit 32A. Other processing in step S12A and step S15A is similar to that in step S12 and step S15 in the embodiment shown in FIGS. 1 to 8.

In step S21A, the inverter control unit 32A of the control device 30A first obtains the d-axis voltage $V_d$ and the q-axis voltage $V_q$ output in step S12A and subsequently obtains the d-axis voltage $V_d$ and the q-axis voltage $V_q$ output in step S15A. The inverter control unit 32A subjects the obtained d-axis voltage $V_d$ and q-axis voltage $V_q$ to, for example, predetermined filter processing and causes a transition of the processing to step S22A. Note that the predetermined filter processing is not essential and may not be performed.

In step S22A, with respect to the obtained d-axis voltage $V_d$ and q-axis voltage $V_q$, the inverter control unit 32A performs a two-phase/three-phase conversion (inverse conversion), obtains inverter output voltage command values $V_U^*$, $V_V^*$, and $V_W^*$, and causes a transition of the processing to step S23A. Note that, with respect to the voltage values $V_U$, $V_V$, and $V_W$ of system voltage, a three-phase/two-phase conversion (dq conversion) is first performed and a two-phase/three-phase conversion (inverse conversion) is subsequently performed because filter processing can be more readily performed on the d-axis voltage $V_d$ and q-axis voltage $V_q$ of two axes as compared to the voltage values $V_U$, $V_V$, and $V_W$ of three phases.

In step S23A, the inverter control unit 32A subjects the obtained inverter output voltage command values $V_U^*$, $V_V^*$, and $V_W^*$ to PWM control and generates a gate signal. The inverter control unit 32A controls a switching element (not illustrated) of the inverter 11 according to the generated gate signal, causes a voltage matching operation (synchronous control) of the power conversion device 1A to be performed, and causes a transition of the processing to step S24A. As a result of the control described above, during a voltage matching operation (synchronous control), a phase and an amplitude of the output voltage of the inverter 11 approximately match a phase and an amplitude of the system voltage. Accordingly, a d-axis current $I_d$ becomes a component in a same phase as the output voltage of the inverter 11 and a q-axis current $I_q$ becomes a component which is phase-advanced by 90 degrees with respect to the output voltage of the inverter 11.

In step S24A, the inverter control unit 32A outputs information on whether or not the power conversion device 1A is performing a voltage matching operation (synchronous control). The information on whether or not the power conversion device 1A is performing a voltage matching operation (synchronous control) is obtained by the fault information reporting unit 36A when appropriate.

FIG. 12 is a diagram showing an example of an operation during a voltage matching operation (synchronous control) of the power conversion device 1A shown in FIGS. 9 to 11.

FIG. 12A is a diagram showing a state during a voltage matching operation (synchronous control) after start-up of the power conversion device 1A and until the power conversion device 1A is synchronized with the side of the system 3. FIG. 12B is a diagram showing a state where the power conversion device 1A has been synchronized with the side of the system 3 as a result of performing a voltage matching operation (synchronous control). FIG. 12C is a diagram showing a state where the alternating-current switch 14 has been closed as a result of the synchronization of the power conversion device 1A with the side of the system 3 due to the voltage matching operation (synchronous control).

In FIG. 12, a left side shows a circuit state. The left side of FIG. 12 shows a diagram in which a part of the components of the power conversion device 1A shown in FIG. 9 has been omitted. On the left side of FIG. 12, the output voltage of the inverter 11 is applied to a left side of the alternating-current switch 14 and the system voltage on the side of the system 3 is applied to a right side of the alternating-current switch 14. In addition, on the left side of FIG. 12, an arrow indicates a pathway of a current output from the inverter 11. A right side of FIG. 12 shows a voltage waveform. On the right side of FIG. 12, a solid line indicates a waveform of the system voltage and a dashed line indicates a waveform of the output voltage of the inverter 11. Note that a the voltage value $V_i$ of the output voltage of the inverter 11 is detected by the first voltage sensor 22, voltage values $V_U$, $V_V$, and $V_W$ of the system voltage of the three phases are detected by the second voltage sensor 23, and detection results are respectively obtained by the control device 30A (refer to FIG. 9 and the like).

In FIG. 12A, when the power conversion device 1A starts up (receives a start-up command), the inverter 11 is controlled by a gate signal output from the inverter control unit 32A and a voltage matching operation (synchronous control) is started. During start-up, since the inverter 11 is controlled by a gate signal based on an arbitrary phase angle θ, a voltage waveform of the output voltage of the inverter 11 and voltage waveforms of the system voltage are initially unsynchronized (S12A, S21A to S23A).

In FIG. 12B, as a result of performing a voltage matching operation (synchronous control), a positive synchronization determination is made. In other words, the phase angle adjusting unit 31A has performed PLL control based on the voltage values $V_U$, $V_V$, and $V_W$ of the three phases obtained from the system voltage and has adjusted the phase angle θ (S14). In addition, once the inverter 11 becomes controlled according to a gate signal based on the adjusted phase angle θ, the phase and the amplitude of the output voltage of the inverter 11 and the phase and the amplitude of the system voltage approximately match each other (S15A, S21A to S23A).

In FIG. 12C, after a positive synchronization determination is made, since the voltage waveform of the output voltage of the inverter 11 and the voltage waveform of the system voltage approximately match each other, for example, the alternating-current switch 14 is closed and a system interconnection operation is started due to an operation instruction by the operation control unit 37A.

Returning to FIG. 11, in step S52A, when the fault determining unit 35A of the control device 30A determines that a fault of the AC capacitor 16 has occurred, the fault determining unit 35A outputs "1" being a determination result to the effect that a fault has occurred to the fault information reporting unit 36A. When the fault determining unit 35A determines that a fault of the AC capacitor 16 has not occurred, the fault determining unit 35A may either output "0" being a determination result to the effect that a fault has not occurred to the fault information reporting unit 36A or may output nothing until a determination that a fault has occurred is made.

In step S61A, the fault information reporting unit 36A of the control device 30A obtains information on whether or not the power conversion device 1A is performing a voltage matching operation (synchronous control) from the inverter control unit 32A when appropriate (refer to S24A). In addition, when the fault determining unit 35A determines that a fault of the AC capacitor has occurred, the fault information reporting unit 36A obtains "1" being a determination result to the effect that a fault has occurred from the fault determining unit 35A (refer to S52A). Furthermore, when the fault information reporting unit 36A obtains "1" being a determination result to the effect that a fault of the AC capacitor 16 has occurred from the fault determining unit 35A after acquiring information to the effect that the power conversion device 1A is performing a voltage matching operation (synchronous control), the fault information reporting unit 36A causes a transition of the processing to step S62A.

In step S62A, when the fault information reporting unit 36A obtains "1" being a determination result to the effect that a fault of the AC capacitor 16 has occurred after acquiring information to the effect that the power conversion device 1A is performing a voltage matching operation (synchronous control), the fault information reporting unit 36A reports fault information. The fault information reporting unit 36A reports fault information by, for example, reporting (outputting) the fault information to a higher-level device or the like (not illustrated) or reporting a warning, an alarm, or the like to a display screen, an operating panel, or the like (not illustrated) of the power conversion device 1A. In addition, the fault information reporting unit 36A also reports (outputs) the fault information to the operation control unit 37A.

In step S71A, when the operation control unit 37A of the control device 30A obtains a report of fault information of the AC capacitor 16 from the fault information reporting unit 36A, the operation control unit 37A issues an operation instruction to each unit of the power conversion device 1A to stop the power conversion device 1A. Accordingly, the operation control unit 37A causes the power conversion device 1A to stop before the start of a system interconnection operation (prior to closing the alternating-current switch 14). Accordingly, spreading of the fault to normal AC capacitors 16a and an outflow of higher harmonics toward the side of the system 3 can be suppressed.

Note that the operation control unit 37A may stop the power conversion device 1A upon receiving an operation instruction via the operating unit from a higher-level device (not illustrated) or an operator (not illustrated) having obtained a report of the fault information by the fault information reporting unit 36A. In addition, when the operation control unit 37A has not obtained a report of the fault information from the fault information reporting unit 36A upon, for example, obtaining information of a positive synchronization determination from the inverter control unit 32A, the operation control unit 37A may issue an operation instruction to close the alternating-current switch 14 and start a system interconnection operation.

Note that the operations after inputting a start-up command of the power conversion device 1 shown in FIG. 7 in the first embodiment shown in FIGS. 1 to 8 can also be applied to the operations after inputting a start-up command of the power conversion device 1A in the second embodiment shown in FIGS. 9 to 12. When the operations shown in FIG. 7 are to be applied to the power conversion device 1A according to the second embodiment shown in FIGS. 9 to 12, the current values $I_U$, $I_V$, and $I_W$ of the capacitor currents flowing through the AC capacitor 16 of three phases are to be detected by the current sensor 21A instead of the current sensor 21.

In addition, the control device 30A determines that a fault has occurred in the AC capacitor 16 (S51) and outputs "1" being a determination result to the effect that a fault has occurred in the AC capacitor 16 to the fault information reporting unit 36A (S52A).

In this case, since the fault information reporting unit 36A is to obtain "1" being a determination result to the effect that a fault of the AC capacitor 16 has occurred during a voltage matching operation of the power conversion device 1A (S61A), the fault information reporting unit 36A reports fault information (S62A). In this case, the operation control unit 37A causes the power conversion device 1A to stop (S71) and causes application of voltage to the AC capacitor 16 to stop.

Accordingly, even in the second embodiment shown in FIGS. 9 to 12, when a fault is detected during a voltage matching operation (synchronous control), the power conversion device 1A can be stopped (start-up can be prevented) before a system interconnection operation. Accordingly, spreading of the fault to normal AC capacitors 16a and an outflow of higher harmonics toward the side of the system 3 can be suppressed.

Operation and Effect of Second Embodiment

As described above, according to the second embodiment shown in FIGS. 9 to 12, similar effects to the first embodiment shown in FIGS. 1 to 8 can be produced.

In addition, in the second embodiment shown in FIGS. 9 to 12, the current sensor 21A is positioned between the inverter 11 and the branch point 12a to the capacitor circuit 15 in the alternating-current circuit 12 on the output side of the inverter 11 so as to be connected in series to the alternating-current reactor 13. Therefore, the current sensor 21A can measure a current flowing through the AC capacitor 16 during a voltage matching operation (during synchronous control) when the alternating-current switch 14 is opened. As a result, according to the second embodiment shown in FIGS. 9 to 12, the control device 30A can detect an open fault of the AC capacitor 16 during a voltage matching operation (synchronous control).

Note that, in the second embodiment shown in FIGS. 9 to 12, the current sensor 21A is positioned at the location described earlier. In this case, during a system interconnection operation in which the alternating-current switch 14 has been closed, since the current sensor 21A confuses a current flowing through the AC capacitor 16 with a current which flows toward the side of the system 3 (unable to distinguish a current flowing through the AC capacitor 16 from a current which flows toward the side of the system 3), the current sensor 21A is unable to extract only the current flowing through the AC capacitor 16. However, in an existing power conversion device 1A, the current sensor 21A is often already positioned at the location described earlier as specifications. Therefore, according to the second embodiment shown in FIGS. 9 to 12, the existing current sensor 21A which has already been positioned can be used in many of the existing power conversion devices 1A.

In addition, in the second embodiment shown in FIGS. 9 to 12, when the control device 30A detects a fault of the AC capacitor 16 during a voltage matching operation (during synchronous control), the control device 30A reports fault information prior to the start of a system interconnection operation (prior to closing the alternating-current switch 14) (S62A). Furthermore, in the second embodiment shown in FIGS. 9 to 12, when the control device 30A detects a fault of the AC capacitor 16 during a voltage matching operation (during synchronous control), the control device 30A stops the power conversion device 1A prior to the start of a system interconnection operation (prior to closing the alternating-current switch 14) (S71A). Accordingly, spreading of the fault to normal AC capacitors 16a and an outflow of higher harmonics toward the side of the system 3 can be suppressed.

Hardware Configuration Example

Figure 13:
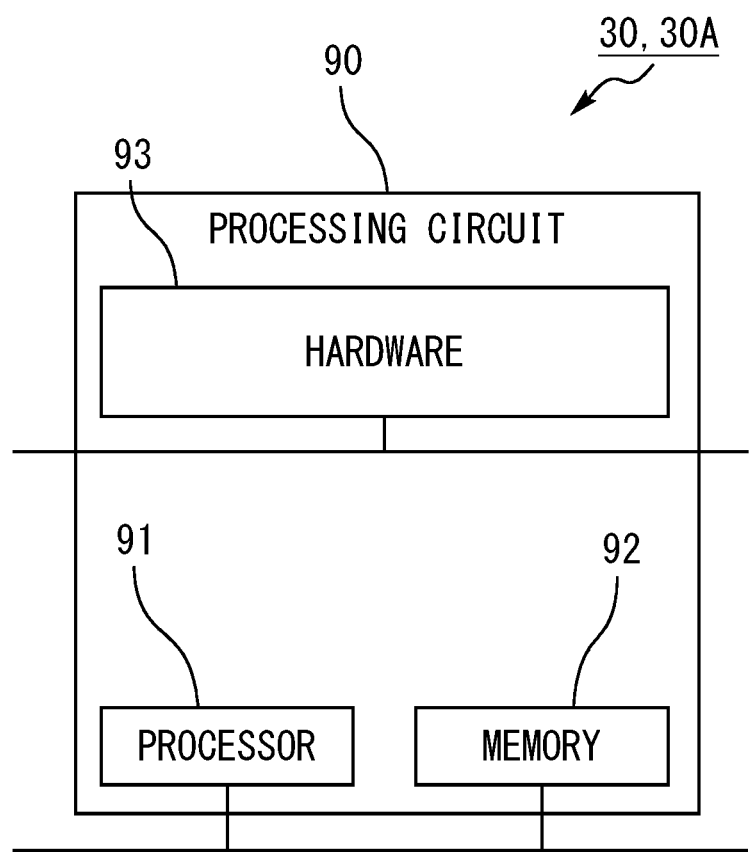
FIG. 13 is a conceptual diagram showing a hardware configuration example of a processing circuit included in the control devices according to the embodiments shown in FIGS. 1 to 12.

FIG. 13 is a conceptual diagram showing a hardware configuration example of the processing circuit 90 included in the control devices 30 and 30A according to the embodiments shown in FIGS. 1 to 12. Each of the functions described above is realized by the processing circuit 90. As an aspect, the processing circuit 90 includes at least one processor 91 and at least one memory 92. As another aspect, the processing circuit 90 includes at least one piece of dedicated hardware 93.

When the processing circuit 90 includes the processor 91 and the memory 92, each function is realized by software, firmware, or a combination of software and firmware. At least one of the software and the firmware is described as a program. At least one of the software and the firmware is stored in the memory 92. The processor 91 realizes each function by reading and executing the program stored in the memory 92.

When the processing circuit 90 includes the piece of dedicated hardware 93, for example, the processing circuit 90 is realized by a single circuit, a combined circuit, a programmed processor, or a combination thereof. Each of the functions is realized by the processing circuit 90.

Each function included in the control devices 30 and 30A may be partially or entirely constituted of hardware or configured as a program to be executed by a processor. In other words, the control devices 30 and 30A can also be realized by a computer and a program and the program can be either stored in a storage medium or provided through a network.

Supplementary Notes on Embodiments

As described above, according to the embodiments shown in FIGS. 1 to 13, while the embodiments are divided into the first embodiment shown in FIGS. 1 to 8 and the second embodiment shown in FIGS. 9 to 12, the embodiments may be combined with each other. In other words, the power conversion device 1 or 1A may be equipped with both the current sensor 21 and the current sensor 21A. In addition, a current (a capacitor current) flowing through the AC capacitor 16 (the capacitor circuit 15) may be measured by any one of or both of the current sensors. Even with a combined embodiment, operations and effects similar to those realized by each of the embodiments prior to being combined can be realized.

In addition, in the embodiments shown in FIGS. 1 to 13, in step S51 shown in FIG. 4 and FIG. 11, the fault determining unit 35 or 35A determines that a fault of the AC capacitor 16 has occurred when an open fault of a part of the AC capacitor 16a has occurred. However, for example, the fault determining unit 35 or 35A may be configured not to determine that a fault of the AC capacitor 16 has occurred when a fault of only one AC capacitor 16a has occurred and to determine that a fault of the AC capacitor 16 has occurred when faults of two or more AC capacitors 16a have occurred. Such a method is effective when, for example, an occurrence of a fault in only one AC capacitor 16a or the like has a low impact on the power conversion device 1 or 1A. Moreover, in keeping with the actual situation, the fault determining unit 35 or 35A may be configured to detect a fault of the AC capacitor 16 when faults occur in three or more AC capacitors 16a.

Furthermore, while an example of an application to a three-phase alternating current in a three-phase alternating-current circuit 12 has been described in the embodiments shown in FIGS. 1 to 13, the present disclosure is not limited thereto. For example, the present disclosure can also be applied to a single-phase alternating-current circuit (a single-phase alternating current) or other polyphase alternating-current circuits (polyphase alternating currents).

In addition, while examples of the power conversion device 1 and 1A and the control devices 30 and 30A included therein have been described as aspects of the present disclosure in the embodiments shown in FIGS. 1 to 13, the present disclosure is not limited thereto. The present disclosure can also be realized as a fault detection method of an alternating-current capacitor in which the processing steps by each unit of the control devices 30 and 30A are performed.

Furthermore, the present disclosure can also be realized as a fault detection program of an alternating-current capacitor which causes a computer to execute the processing steps by each unit of the control devices 30 and 30A.

In addition, the present disclosure can also be realized as a storage medium (a non-transitory computer-readable medium) which stores a fault detection program of an alternating-current capacitor. The fault detection program of an alternating-current capacitor can be stored in a removable medium such as a CD (compact disc), a DVD (digital versatile disc), or a USB (universal serial bus) memory to be distributed. Alternatively, the fault detection program of an alternating-current capacitor may be uploaded onto a network via a network interface (not illustrated) included in the control devices 30 and 30A or downloaded from the network to be stored in the storage unit 40 or the like.

Features and advantages of the embodiments will become apparent from the foregoing detailed description. The scope of the claims is intended to cover the features and the advantages of the embodiments as described above without departing from the spirit and the scope of the invention. It will also be obvious to those skilled in the art that many improvements and modifications may be made. Therefore, it is to be understood that the scope of inventive embodiments is not intended to be limited to the embodiments described above and that the invention also includes appropriate improvements and equivalents as fall within the scope disclosed in the embodiments.

REFERENCE SIGNS LIST 1, 1A Power conversion device (PCS)
2 Direct-current power supply
3 Alternating-current power system (system)
11 Inverter circuit (inverter)

12 Three-phase alternating-current circuit (alternating-current circuit)
12a Branch point
13 Alternating-current reactor (AC reactor)
14 Alternating-current switch (alternating-current switchgear, AC switch)
15 Capacitor circuit
16 Alternating-current capacitor (AC capacitor)
16a Alternating-current capacitor (AC capacitor)
16b Security mechanism
21, 21A Current sensor
22 First voltage sensor
23 Second voltage sensor
30, 30A Control device
31, 31A Phase angle adjusting unit
32A Inverter control unit
33 Amplitude calculating unit
35, 35A Fault determining unit (comparator)
36A Fault information reporting unit
37, 37A Operation control unit
40 Storage unit
90 Processing circuit
91 Processor
92 Memory
93 Hardware
$I_d$ d-axis current
$I_q$ q-axis current
$I_U$ Current value
$I_{Uabs}$ Capacitor current
$I_{Ut}$ Determination value
$I_V$ Current value
$I_{Vabs}$ Capacitor current
$I_{Vt}$ Determination value
$I_W$ Current value
$I_{Wabs}$ Capacitor current
$I_{Wt}$ Determination value
$V_d$ d-axis voltage
$V_i$ Voltage value
$V_q$ q-axis voltage
$V_U^*$ Inverter output voltage command value
$V_U$ Voltage value
$V_V^*$ Inverter output voltage command value
$V_V$ Voltage value
$V_W^*$ Inverter output voltage command value
$V_W$ Voltage value
θ Phase angle

The invention claimed is:

1. A control device of a power conversion device including:
    at least one alternating-current capacitor which is positioned in a capacitor circuit branching from an alternating-current circuit on an output side of an inverter and which is disconnected from the capacitor circuit in an event of a fault; and
    a current sensor which is positioned in the capacitor circuit and which obtains each of current values of alternating currents of respective phases that flow through the alternating-current capacitor,
    the control device comprising:
    an amplitude calculating circuit which obtains each of the current values of the alternating currents of the respective phases that flow through the alternating-current capacitor from the current sensor and which calculates each of values of amplitudes of fundamental wave components of the alternating currents of the respective phases based on the obtained current values of the alternating currents of the respective phases; and
    a fault determining circuit which performs a magnitude comparison between each of the values of the amplitudes of the fundamental wave components of the alternating currents of the respective phases calculated by the amplitude calculating circuit and a predetermined determination value and which determines a fault of the alternating-current capacitor when the value of the amplitude of at least any phase among the values of the amplitudes of the fundamental wave components of the alternating currents of the respective phases is smaller than the predetermined determination value, wherein
    the amplitude calculating circuit calculates each of the values of the amplitudes of the fundamental wave components of the alternating currents of the respective phases based on a predetermined current component of the alternating current of each phase calculated by multiplying each of the current values of the alternating currents of the respective phases by a value based on a phase angle adjusted based on a system voltage on a system side.

2. The control device according to claim 1, wherein
    the amplitude calculating circuit calculates each of the values of the amplitudes of the fundamental wave components of the alternating currents of the respective phases based on a direct-current component extracted using a predetermined low-pass filter from a predetermined current component of the alternating current of each phase.

3. The control device according to claim 1, further comprising:
    an operation control circuit which, when a fault of the alternating-current capacitor is determined by the fault determining circuit in a state where an alternating-current switch on the system side has been closed, outputs an operation instruction to stop the power conversion device and, at the same time, open the alternating-current switch.

4. The control device according to claim 1, further comprising:
    an operation control circuit which, when a fault of the alternating-current capacitor is determined by the fault determining circuit during synchronous control for synchronizing an output voltage of the inverter and the system voltage of the system side which is performed during start-up of the power conversion device in a state where an alternating-current switch on the system side has been opened, outputs an operation instruction to stop the power conversion device.

5. A power conversion device comprising:
    an inverter which converts power and outputs alternating-current power;
    at least one alternating-current capacitor which is positioned in a capacitor circuit branching from an alternating-current circuit on an output side of the inverter and which is disconnected from the capacitor circuit in an event of a fault;
    a current sensor which is positioned in the capacitor circuit and which obtains each of current values of alternating currents of respective phases that flow through the alternating-current capacitor;
    an alternating-current switch which is positioned closer to a system side than a branch point to the capacitor circuit in the alternating-current circuit and which is capable of interrupting the alternating current flowing towards the system side; and
    the control device according to claim 1.

6. A control device of a power conversion device including:
- at least one alternating-current capacitor which is positioned in a capacitor circuit branching from an alternating-current circuit on an output side of an inverter and which is disconnected from the capacitor circuit in an event of a fault; and
- a current sensor which is positioned in series with an alternating-current reactor between the inverter and a branch point to the capacitor circuit in the alternating-current circuit on the output side of the inverter and which obtains each of current values of alternating currents of respective phases that flow through the alternating-current circuit, the control device comprising:
- an amplitude calculating circuit which, during synchronous control for synchronizing an output voltage of the inverter and a system voltage of a system side which is performed during start-up of the power conversion device in a state where an alternating-current switch on the system side has been opened, obtains each of the current values of the alternating currents of the respective phases that flow through the alternating-current capacitor from the current sensor and which calculates each of values of amplitudes of fundamental wave components of the alternating currents of the respective phases based on the obtained current values of the alternating currents of the respective phases;
- a fault determining circuit which performs a magnitude comparison between each of the values of the amplitudes of the fundamental wave components of the alternating currents of the respective phases calculated by the amplitude calculating circuit and a predetermined determination value and which determines a fault of the alternating-current capacitor when the value of the amplitude of at least any phase among the values of the amplitudes of the fundamental wave components of the alternating currents of the respective phases is smaller than the predetermined determination value; and
- a fault information reporting circuit which, when a fault of the alternating-current capacitor is determined by the fault determining circuit during the synchronous control, reports fault information of the alternating-current capacitor, wherein the amplitude calculating circuit calculates each of the values of the amplitudes of the fundamental wave components of the alternating currents of the respective phases based on a predetermined current component of the alternating current of each phase calculated by multiplying each of the current values of the alternating currents of the respective phases by a value based on a phase angle adjusted based on the system voltage on the system side.

7. The control device according to claim 6, wherein:
the amplitude calculating circuit calculates each of the values of the amplitudes of the fundamental wave components of the alternating currents of the respective phases based on a direct-current component extracted using a predetermined low-pass filter from a predetermined current component of the alternating current of each phase.

8. The control device according to claim 6, further comprising:
- an operation control circuit which, when a fault of the alternating-current capacitor is reported by the fault information reporting circuit during the synchronous control, outputs an operation instruction to stop the power conversion device.

9. A power conversion device comprising:
- an inverter which converts power and outputs alternating-current power;
- at least one alternating-current capacitor which is positioned in a capacitor circuit branching from an alternating-current circuit on an output side of the inverter and which is disconnected from the capacitor circuit in an event of a fault;
- a current sensor which is positioned in series with an alternating-current reactor between the inverter and a branch point to the capacitor circuit in the alternating-current circuit on the output side of the inverter and which obtains each of current values of alternating currents of respective phases that flow through the alternating-current circuit; an alternating-current switch which is positioned closer to a system side than the branch point in the alternating-current circuit and which is capable of interrupting the alternating current flowing towards the system side; and the control device according to claim 6.

* * * * *